US011711489B2

(12) United States Patent
Patel et al.

(10) Patent No.: US 11,711,489 B2
(45) Date of Patent: *Jul. 25, 2023

(54) METHODS AND SYSTEMS FOR CUSTOMIZING SKIP-FORWARD FUNCTIONALITY

(71) Applicant: Rovi Guides, Inc., San Jose, CA (US)

(72) Inventors: Milan Patel, Santa Clara, CA (US); Abubakkar Siddiq, Methuen, MA (US); Ajay Kumar Gupta, Andover, MA (US); Sai Rahul Reddy Pulikunta, Andover, MA (US); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,826

(22) Filed: Nov. 30, 2020

(65) Prior Publication Data

US 2021/0152775 A1    May 20, 2021

Related U.S. Application Data

(63) Continuation of application No. 16/193,911, filed on Nov. 16, 2018, now Pat. No. 10,855,949, which is a continuation of application No. 14/789,593, filed on Jul. 1, 2015, now Pat. No. 10,178,344.

(51) Int. Cl.
*H04N 5/783* (2006.01)
*G11B 27/00* (2006.01)

(52) U.S. Cl.
CPC ........... *H04N 5/783* (2013.01); *G11B 27/005* (2013.01)

(58) Field of Classification Search
CPC .............................. G11B 27/005; H04N 5/783
See application file for complete search history.

(56) References Cited

U.S. PATENT DOCUMENTS

| 2003/0093790 | A1 | 5/2003 | Logan et al. |
| 2003/0185541 | A1 | 10/2003 | Green |
| 2006/0078297 | A1 | 4/2006 | Nishikawa et al. |
| 2007/0098357 | A1 | 5/2007 | McEnroe et al. |
| 2007/0156739 | A1 | 7/2007 | Black et al. |
| 2008/0107402 | A1* | 5/2008 | Angiolillo ............ H04N 5/4403 386/234 |
| 2015/0078562 | A1* | 3/2015 | Shanmugasundaram .................... G11B 27/00 381/61 |

* cited by examiner

*Primary Examiner* — Girumsew Wendmagegn
(74) *Attorney, Agent, or Firm* — Haley Guiliano LLP

(57) ABSTRACT

In some aspects, control circuitry receives and stores a user-specified time duration to associate with a skip-forward command. When the user later issues a skip-forward command to advance playback of a media asset to a desired location, the control circuitry retrieves the stored time duration, and determines an expected overshoot value associated with the skip-forward command. The control circuitry then compensates for the expected overshoot by calculating a new location in the media asset based on both the retrieved time duration and expected overshoot value. Upon advancing to the new location, the media asset is played back in a fast-forward mode, e.g., at a speed higher than normal speed.

20 Claims, 11 Drawing Sheets

600A

600B

600C

600D

METHODS AND SYSTEMS FOR CUSTOMIZING SKIP-FORWARD FUNCTIONALITY

CROSS-REFERENCE TO RELATED APPLICATION

This application is a Continuation Application of U.S. patent application Ser. No. 16/193,911, filed Nov. 16, 2018, which is a Continuation Application of U.S. patent application Ser. No. 14/789,593, filed Jul. 1, 2015, now U.S. Pat. No. 10,178,344, which are hereby incorporated by reference herein in their entireties.

BACKGROUND

Users of entertainment systems often invoke skip-forward functionality (e.g., fast-forwarding or a 30-second skip button) to advance to a desired location in a video, or to skip over content such as commercials, segments that the user has previously viewed, or segments otherwise of limited interest to the user. Current skip-forward functionality is cumbersome to use, however, because the options provided offer limited, if any, flexibility and because users tend to overestimate the amount of time required to advance to the desired location, resulting in the resumption of the video at a point subsequent to the desired location. This forces the user to enter additional inputs to rewind playback of the video to reach the desired location, which may itself result in another overshoot. In short, users wishing to skip over content often find themselves inputting multiple commands, experiencing a relatively prolonged interruption in their viewing experience, and viewing at least some content they would otherwise prefer to skip.

SUMMARY

Methods and systems are provided herein for enabling a user to set a custom skip-forward time duration, which the control circuitry may use during the execution of a skip-forward command. For example, in one embodiment, the control circuitry receives and stores a user-specified time duration. When the user later issues a skip-forward command to advance playback of a media asset to a desired location, the control circuitry receives the command, retrieves the stored time duration, and determines an expected overshoot value associated with the issued skip-forward command. The control circuitry may then compensate for the expected overshoot by calculating a new location in the media asset based on the time duration and expected overshoot value. Upon advancing to the new location, the control circuitry may control playback of the media asset so that playback resumes at a speed greater than normal speed (e.g., in a low-speed fast-forwarding mode).

In some aspects, the control circuitry may receive input, from a user, specifying a time duration to associate with a skip-forward command. In an illustrative scenario, for instance, the control circuitry receives a user request to display a media asset (e.g., a recording of an episode of "The Big Bang Theory"). Before the control circuitry proceeds to generate the media asset for display on a display device, the control circuitry generates for display, on the display device, several options corresponding to durations of time selectable by the user. For example, the control circuitry presents options corresponding to durations of time equivalent to one minute, two minutes, and five minutes. The control circuitry then receives user input, via a user input interface, selecting a duration of time associated with one of the presented options. For example, the control circuitry receives a user's selection of a skip-forward time duration of five minutes.

The control circuitry may then store the received time duration. For example, the control circuitry stores the time duration in storage, such as a hard drive or memory in the user device or at a server. Furthermore, the control circuitry may associate the received time duration with the requested (or currently displayed) media asset. For example, the control circuitry may associate the five-minute duration of time with the currently viewed episode of "The Big Bang Theory."

The control circuitry may subsequently receive a skip-forward command from the user during playback of the media asset. For example, after viewing the media asset (e.g., the episode of "The Big Bang Theory") for three minutes, the user may encounter a block of commercials in the playback of the media asset. As the user may be uninterested in viewing the block of commercials and instead may wish to continue viewing the episode as quickly as possible, the user is able to issue a skip-forward command. The control circuitry then receives the skip-forward command from the user.

The control circuitry may retrieve the user-specified time duration after receiving the skip-forward command. For example, upon receiving the skip-forward command, the control circuitry reads data stored in storage to determine that the user-specified time duration is equal to five minutes. The control circuitry sets the skip-forward time duration to the user-specified time duration.

In some embodiments, the control circuitry determines an expected overshoot value. Continuing the above example, the control circuitry queries a media guidance source to determine that the average duration of time by which users viewing the media asset (e.g., the particular episode of "The Big Bang Theory") tend to overshoot after invoking a skip-forward command (e.g., fast forwarding) is equal to one minute. In another example, the control circuitry determines an expected overshoot value based on user history associated with the user (e.g., the user's own average amount of overshoot for similar shows or other episodes of the series). As will become more apparent below, control circuitry may utilize a number of different or complimentary approaches to determine the expected overshoot value.

The control circuitry may calculate a new location in the media asset that is advanced from a current location based on the user-specified time duration and the expected overshoot value. In the example, while generating a media asset (e.g., the episode of "The Big Bang Theory") for display, control circuitry determines that the user-specified time duration is set to five minutes and that the expected overshoot value is one minute. The control circuitry may then calculate a new location in the media asset by subtracting the expected overshoot value (e.g., one minute) from the user-specified time duration (e.g., five minutes), thus setting the new location to the result of the calculation (e.g., four minutes from the current location in the playback of the media asset).

In some embodiments, the control circuitry causes playback of the media asset to resume from the new location at a speed greater than normal playback speed. For example, after the control circuitry determines the new location (e.g., a location that is four minutes advanced in the media asset), the control circuitry skips to the new location, and initiates playback of the media asset in a low-speed fast-forwarding mode (e.g., at a speed twice as fast as the default speed that the control circuitry uses during normal playback of the media asset).

In some embodiments, when the control circuitry determines that a user-specified time duration for skip-forwarding is unavailable (e.g., because it has not been set for the particular media asset being viewed), the control circuitry determines the time duration automatically. For example, the control circuitry may determine the last-used time duration, or it may query a stored user profile to determine the most commonly used skip-forward time duration by that user. In another example, the control circuitry queries a command execution log to determine the time duration associated with the last skip-forward command issued by the user. The command execution log may list all commands previously issued by the user, such as skip-forward commands with associated time durations. The commands may have associated timestamps indicating the date and time of execution, as well as the media assets that were playing at the time the commands were issued. In some embodiments, when the control circuitry determines that a user-specified time duration for skip-forwarding is unavailable (e.g., because it has not been set for the particular media asset being viewed), the control circuitry determines a default time duration automatically, which may have been set by the user and/or the system. For example, before the user issues the skip-forward command (e.g., when setting up general media preferences), the control circuitry may receive a user input specifying a default time duration for skip-forwarding (e.g., five minutes), which may be different from a system default (e.g., three minutes).

In some embodiments, the control circuitry detects that a command originating from a remote control is received. For example, control circuitry detects that the user issues a skip-forward command using a skip-forward remote control button during playback of a media asset. In some embodiments, when the control circuitry determines that the user has not yet provided a skip-forward time duration associated for the media asset being viewed, the control circuitry waits for further input from the user before initiating the skip-forward function, e.g., a selection of a number button on the remote control indicative of the desired time duration. The control circuitry may detect, for example, that the user selected the number five button indicating that he or she wishes to skip forward by five minutes through the media asset. The control circuitry, upon receiving the input from the remote control corresponding to the number button may proceed to skip forward through the media asset by five minutes. It is contemplated that the media asset may continue to play until the second user input is received (indicating the desired skip-forward time duration), or that the media asset may be paused as soon as the first input (the skip-forward command) is received. In still other embodiments, the control circuitry automatically selects a time duration (e.g., a default time duration or the last-used time duration) if the user fails to indicate a desired time duration within a particular window of time (e.g., five seconds).

In some embodiments, the media asset is displayed on one device (e.g., a television) while options related to the skip-forwarding feature are displayed and/or invoked on another device (e.g., a smartphone). For example, the control circuitry of user television equipment may generate a video corresponding to a media asset for display on its display screen, while control circuitry of a wireless communications device receives, using a user input interface, a user request to skip forward through the displayed media asset. The control circuitry of the wireless device may then generate for display on its display a skip-back button and a skip-forward button. In some embodiments, the control circuitry of the wireless device determines whether a skip-forward time duration for the media asset has previously been set by the user. If not, the control circuitry of the wireless device may generate for display, on its display screen, an informative message which requests that the user provide a skip-forward time duration for the media asset. The control circuitry may further generate for display a first skip-forward time duration option (e.g., for skipping forward by one minute), a second skip-forward time duration option (e.g., for skipping forward by five minutes), and a third skip-forward time duration option (e.g., for skipping forward by a custom amount of minutes). The control circuitry may then monitor for user input selecting one of the options. For example, the control circuitry may detect that the user, using the user input interface of the wireless communications device, selected the second skip-forward time duration option (e.g., for skipping forward by five minutes). Once the control circuitry of the wireless device determined the skip-forward duration, it communicates with the control circuitry of the user television equipment (e.g., via infrared, other near-field communication path, or through an Internet connection) to advance playback of the media asset based on the determined time duration. Either of the control circuitries may additionally calculate an overshoot value to modify the location at which playback resumes.

In some embodiments, the control circuitry calculates the overshoot value by determining the average duration of time by which users tend to overshoot when invoking a skip-forwarding command with the determined time duration. The control circuitry determines this value by analyzing a log listing the duration of each rewind operation issued by each user subsequent to (and in close proximity to) a skip-forward command. In this example, the control circuitry interprets an immediate rewind operation following a skip-forward operation as evidence of a user attempting to compensate for a resultant overshoot. In a different example, the control circuitry receives, from a media guidance data source, the average duration of time by which users viewing the media asset tend to overshoot after skip-forwarding. The media guidance data source may contain information based on a conducted analysis of skip-forwarding and rewind operations, as discussed below in paragraph 99.

In some embodiments, the control circuitry determines an expected overshoot value based on data contained in a user profile associated with the user. The control circuitry may analyze the user profile and may determine that the user profile contains a log of each rewind operation which follows a skip-forward operation. Control circuitry may determine an expected overshoot value by averaging a set or subset of time durations associated with rewind operations that follow skip-forward operations. In a different example, the control circuitry calculates the overshoot value based on the average overshoot associated with the media asset that the control circuitry is currently generating for display. In another example, the control circuitry, using media guidance data, determines that the media asset that the control circuitry is currently generating for display is an episode that is part of a series of episodes. The control circuitry may then determine the average overshoot value associated with one or more episodes of the series. Similarly, the control circuitry may calculate the overshoot value based on overshoot values associated with all media assets that the user has viewed in the past. In a last example, control circuitry calculates the overshoot value based on the type of media asset that the control circuitry is currently generating for display.

In some embodiments, the control circuitry calculates a new location in a media asset that is advanced from a current location based on the user-specified time duration, the expected overshoot value, and the content of media asset at the new location. For example, while generating a media asset (e.g., the episode of "The Big Bang Theory") for display, the control circuitry determines that the user-specified time duration has been set to five minutes. The control circuitry may then determine that the expected overshoot value is set to one minute. The control circuitry may then calculate a new location in the media asset by subtracting the expected overshoot value (e.g., one minute) from the user-specified time duration (e.g., five minutes), thus setting the new location to the result of the calculation. The control circuitry may then determine whether the content of the media asset at the new location is a commercial. For example, the control circuitry analyzes data associated with the media asset to determine whether the content associated with the new location contains a reference to a commercial. Such data may include closed caption data, audio data, visual data, metadata, and the like. The control circuitry may, in response to determining that the new location contains a commercial, proceed to determine a new location in the media asset by analyzing data associated with each subsequent location. For example, the control circuitry determines a subsequent location by incrementing the location by one second. The control circuitry may then determine whether content associated with the subsequent location still contains a reference to a commercial, as described above. Once the control circuitry reaches a particular location that no longer contains a commercial, the control circuitry may set the particular location as the new location in the media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
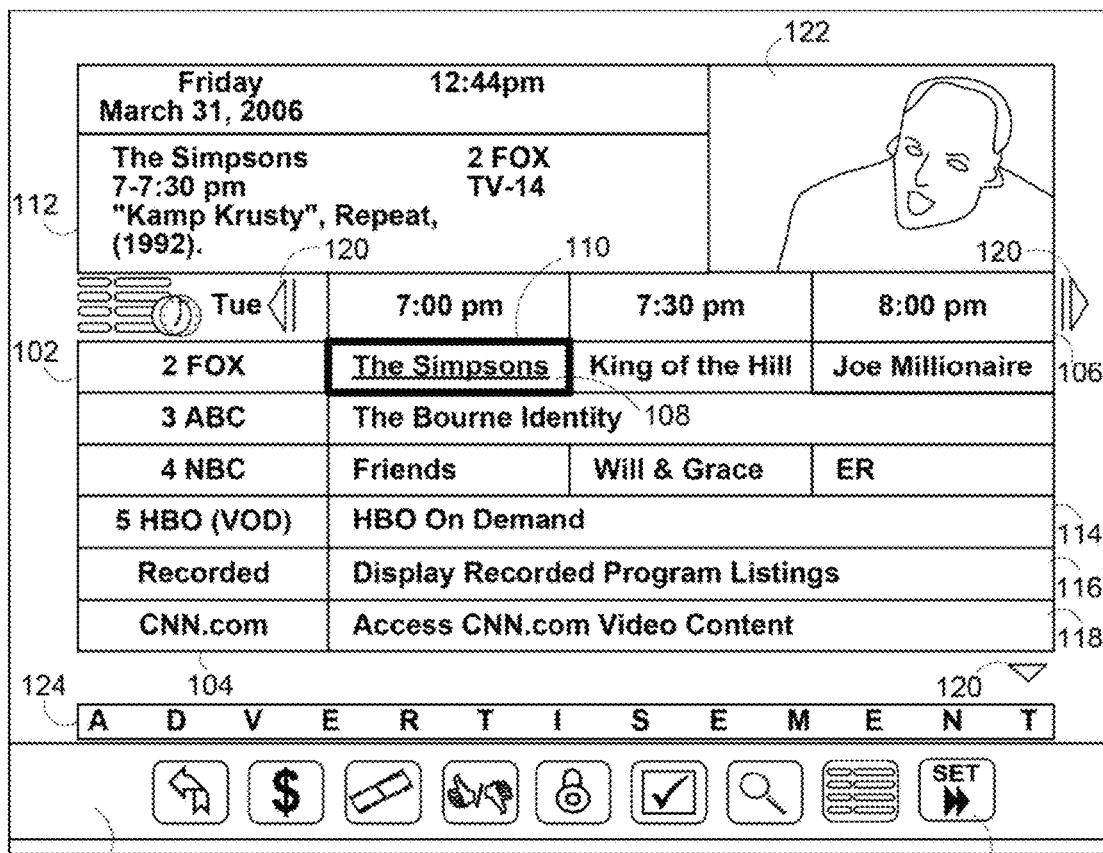
FIG. 1 shows an illustrative example of a display screen generated by a media guidance application in accordance with some embodiments of the disclosure.

Methods and systems are provided herein for enabling a user to set a custom skip-forward time duration, which control circuitry may use during the execution of a skip-forward command. For example, in one embodiment, control circuitry receives and stores a user-specified time duration. When the user later issues a skip-forward command to advance playback of a media asset to a desired location, control circuitry may receive the command, retrieve the stored time duration, and determine an expected overshoot value associated with the issued skip-forward command. Control circuitry may then compensate for the expected overshoot by calculating a new location in the media asset based on the time duration and expected overshoot value. Upon advancing to the new location, control circuitry may control playback of the media asset so that playback resumes at a speed greater than normal playback speed (e.g., in a low-speed fast-forwarding mode).

As used herein, the term "skipping forward" should be understood to correspond to an operation performed by control circuitry which advances the playback location in a media asset from a first location to a second location based on a specified duration of time.

As used herein, the term "location" should be understood to correspond to a time point in a media asset. For example, a location in a media asset is defined based on a point occurring five minutes and thirty seconds after the start of the media asset playback. In another example, a location is defined as a point occurring four minutes following another location, (e.g., the location four minutes after of the start of the first block of commercials in a recorded episode of "The Big Bang Theory").

As referred to herein, the term "overshoot" should be understood to correspond to a duration of time as measured from a location at which the user desires to resume playback of a media asset to the location that control circuitry advances to in response to a user request to skip-forward through the media asset.

As referred to herein, the term "crowdsourcing" should be understood to correspond to the process of collecting and extracting data from users connected in a network. Data collected through such an effort is referred to as "crowdsourced data."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
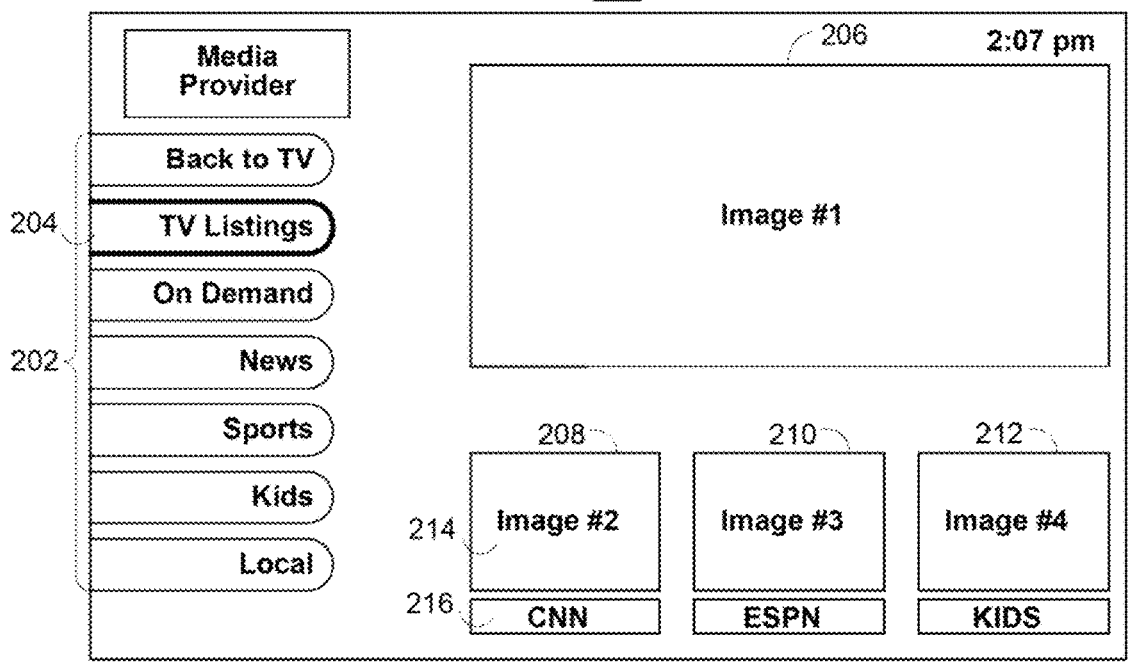
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to set a skip-forward time, or other options.

Options region 126 may include option 128 for setting skip-forward time duration. Selecting this option allows the user to set a skip-forward time for program listing 108. As will become more apparent below, the option may be set using an input window that provides the user with multiple options for selecting a skip-forward time duration. Once the skip-forward time is set, control circuitry may associate program listing 108 with the skip-forward time duration.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
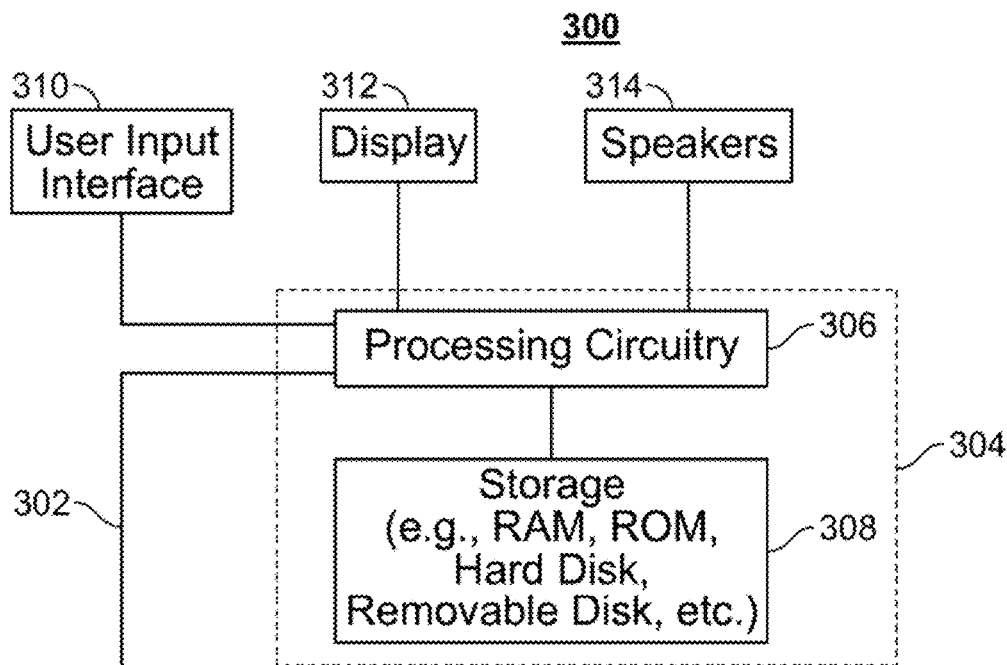
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
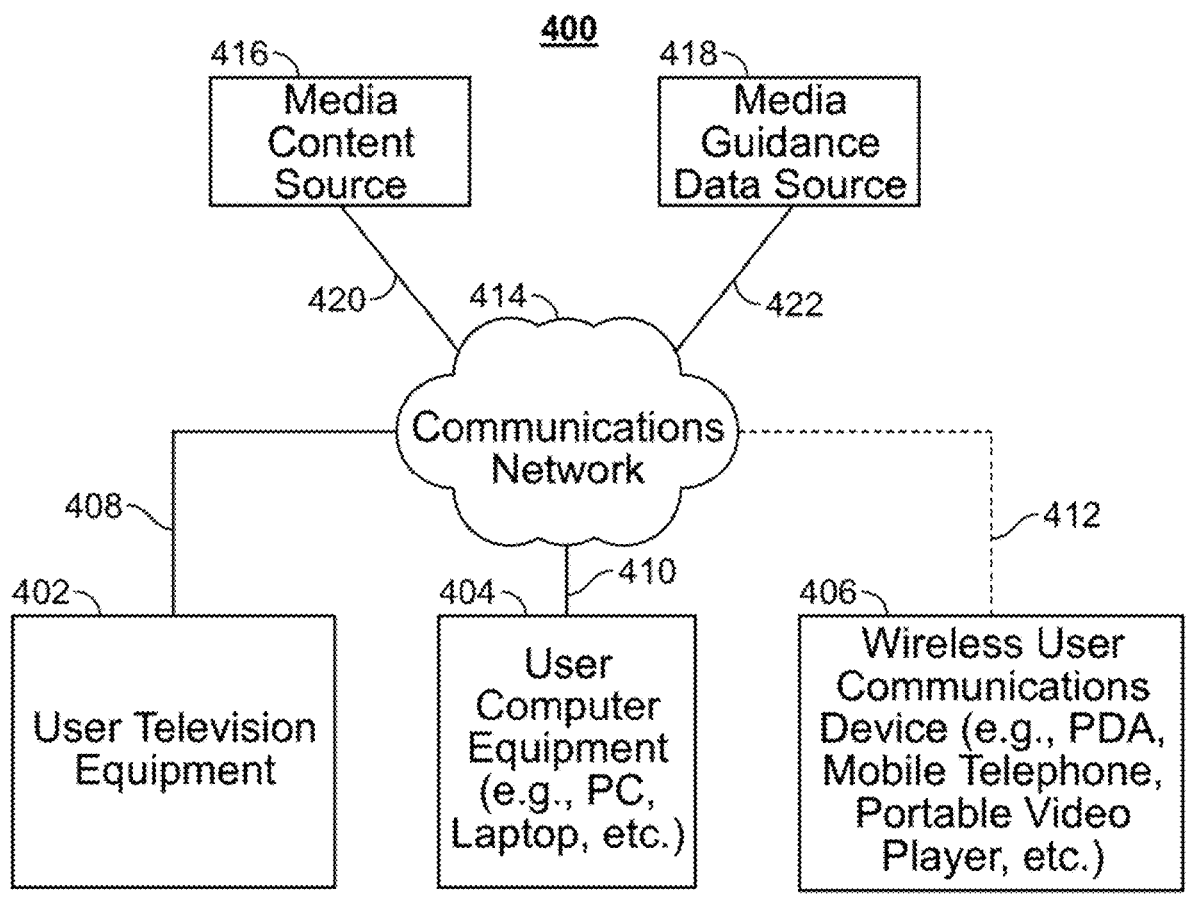
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
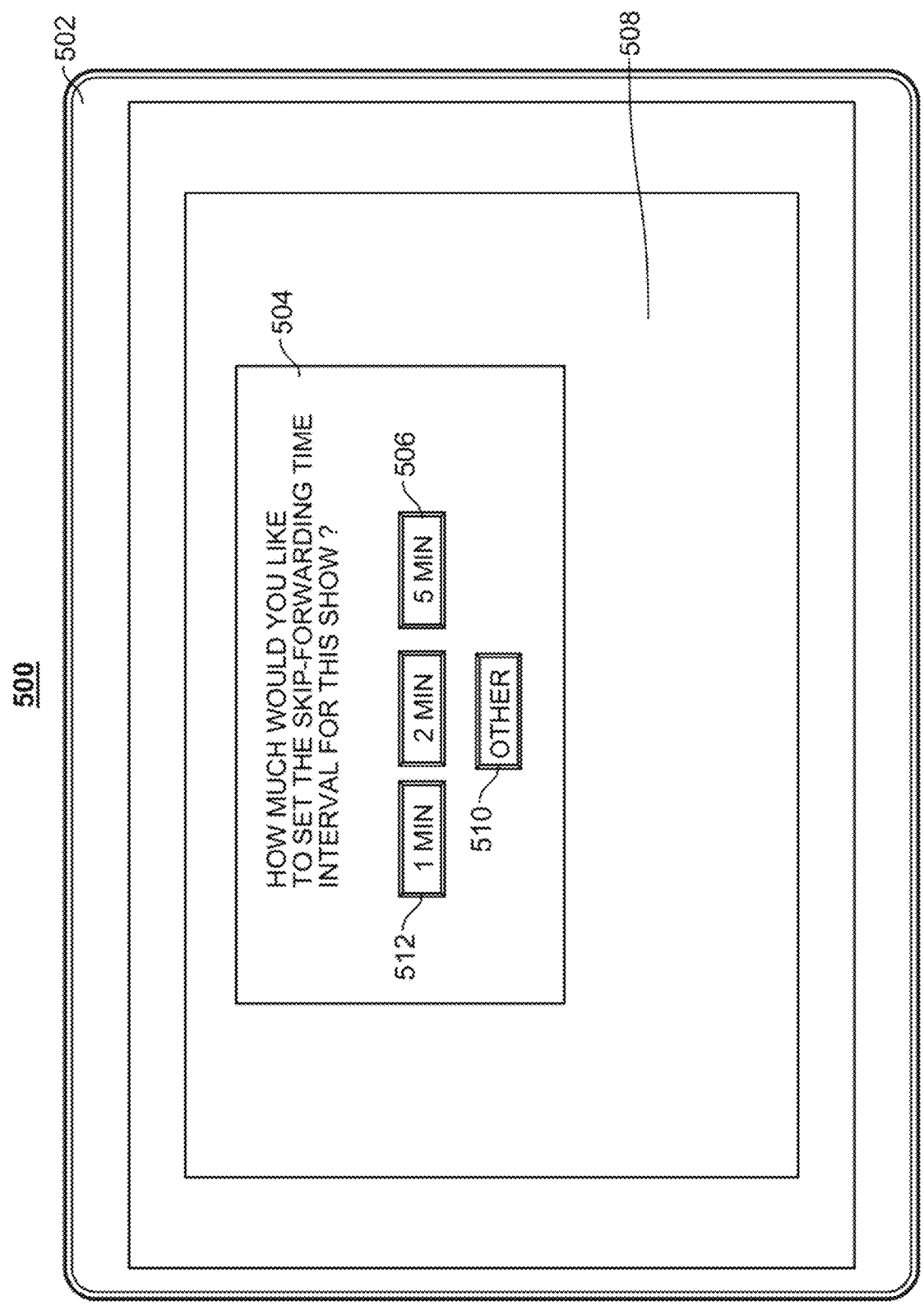
FIG. 5 shows an illustrative embodiment of display of user equipment displaying a media asset, with an overlaid input window for specifying a skip-forward time duration, in accordance with some embodiments of the disclosure.

FIG. 5 shows an illustrative embodiment of display 312 of user equipment 502 showing media asset 508, with a time duration input window 504 overlaid over the rendering of media asset 508. The time duration input window is generated for display by control circuitry for allowing the user to specify a skip-forward time duration, in accordance with some embodiments of the disclosure. User equipment 502 is depicted as the display 312 of user television equipment 402, but may be any user equipment device including user computer equipment 404, or wireless user communications device 406.

In some embodiments, control circuitry 304 generates for display a video corresponding to a media asset 508 (e.g., a recording or a streaming episode of "The Big Bang Theory"), on display 312 of user equipment 502. Control circuitry 304 may display the time duration input window 504 in order to instruct the user to specify a time duration for skip-forwarding through media asset 508. The time duration input window 504 may display selectable options allowing the user to specify a skip-forward time duration. For example, the time duration input window, generated by control circuitry 304, displays a first option 512 (e.g., a one-minute time duration option), a second option 506 (e.g., a five-minute time duration option), and a third option 510 (e.g., for allowing the user to manually select the time duration).

In one example, control circuitry 304 displays the time duration input window 504 after receiving the first skip-forward command during playback of media asset 508. As a second example, control circuitry 304 displays the time duration input window 504 in response to the user requesting start of playback of media asset 508. In another example, control circuitry 304 receives an input from the user requesting to set a default time duration (e.g., when setting up general media preferences) to associate with a skip-forward command for all assets that the user views. In a last example, control circuitry 304 displays the time duration input window 504 after detecting that the user has selected option 128 for setting the skip-forward time duration.

In some embodiments, control circuitry 304 receives input, from a user, specifying a time duration to associate with a skip-forward command. For example, control circuitry 304 receives input from a user after generating for display the time duration input window 504. Control circuitry 304 may associate the first, second, and third options 506, 510, and 512 with a time duration. For example, control circuitry 304 associates the depression of a key (e.g., the key labeled "5") on a remote control keypad with a user selection of the second option 506 (e.g., a five-minute time duration option), which is associated with a five-minute time duration. As will be described in further detail below, control circuitry 304 may receive input from the user through various other means. For example, control circuitry 304 receives user input through a user input interface 310 of a second device, such as a wireless user communications device 405, which control circuitry 304 connects to using communications network 414.

In some embodiments, control circuitry 304 stores the received time duration. For example, control circuitry 304 stores the time duration in storage 308, such as a hard disk associated with a user equipment device 502. Furthermore, control circuitry 304 may associate the received time duration with media asset 508 which control circuitry 304 is generating for display. For example, control circuitry 304 associates an input of a time duration of five minutes with a media asset 508 (e.g., the episode of "The Big Bang Theory"). When storing the time duration, control circuitry 304 may associate and store a genre (e.g., "comedy series") corresponding to media asset 508. In a different example, the received time duration may be stored in storage 308 as part of a user profile associated with the user.

Figure 6A:
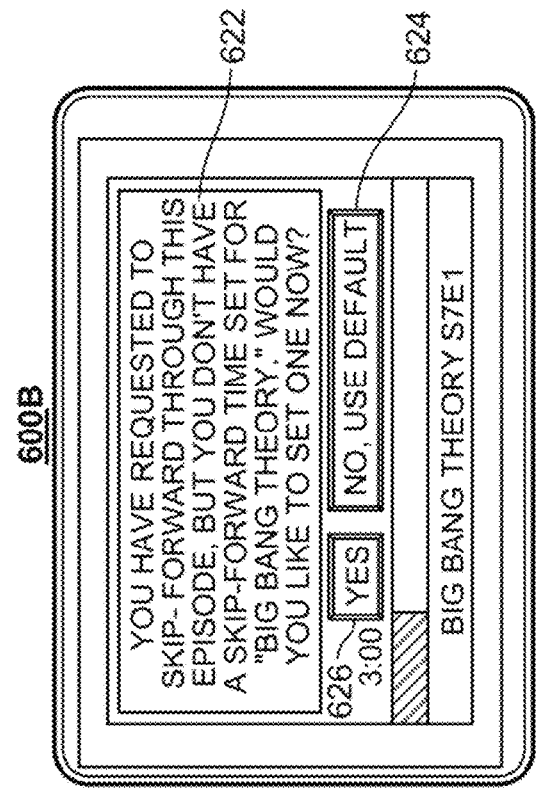
FIG. 6A shows an illustrative embodiment of the display of user equipment displaying a media asset before a skip-forward operation is issued in accordance with some embodiments of the disclosure.

FIG. 6A shows an illustrative embodiment of the display of user equipment displaying a media asset before a skip-forward operation is issued in accordance with some embodiments of the disclosure. Control circuitry 304 may play back media asset 508 at a normal speed until control circuitry 304 detects that a user issued a command to skip-forward through the media asset.

Figure 6B:
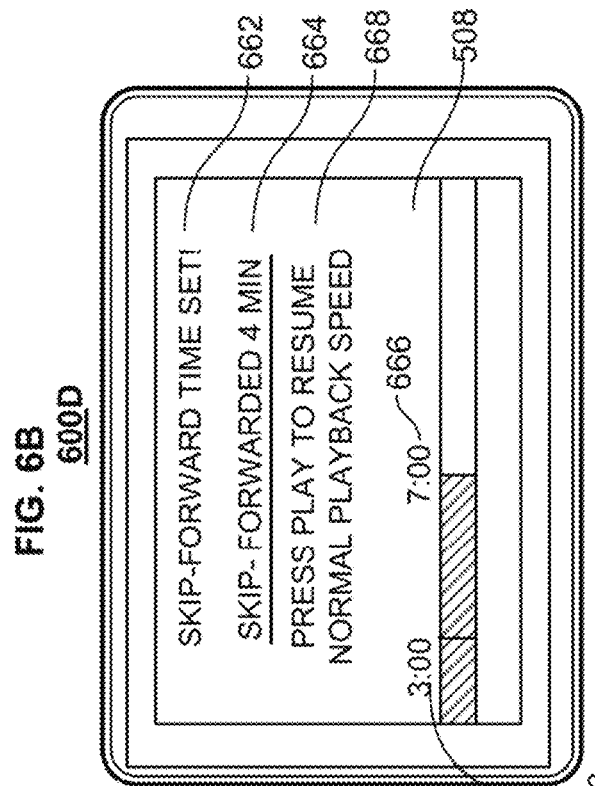
FIG. 6B shows an illustrative embodiment of the display of user equipment displaying an informational message indicating that a skip-forward time duration has not been set, in accordance with some embodiments of the disclosure.

FIG. 6B shows an illustrative embodiment of the display of user equipment displaying an informational message indicating that a skip-forward time duration has not been set, in accordance with some embodiments of the disclosure. Control circuitry 304 may receive a skip-forward command from the user during playback of the media asset 508. For example, after viewing media asset 508 (e.g., the episode of "The Big Bang Theory") for three minutes, the user encounters a block of commercials in the playback of the media asset 508. As the user may be uninterested in viewing the block of commercials and instead may want to return to viewing the episode as quickly as possible, the user may issue a skip-forward command. Control circuitry 304 may detect the skip-forward command by detecting a command entered by way of user input interface 310, which, in some embodiments, is a remote control which control circuitry 304 has connected to via communications network 414. For example, control circuitry 304 detects, at a first time 602 (e.g., six minutes and thirty seconds from the start of media asset playback) that the user has depressed the button corresponding to the skip-forward operation on a remote control. In response to receiving a skip-forward command from the user, control circuitry 304 may display a first informational message 622 (e.g., indicating that a skip-forward time duration has not previously been set).

Figure 6C:
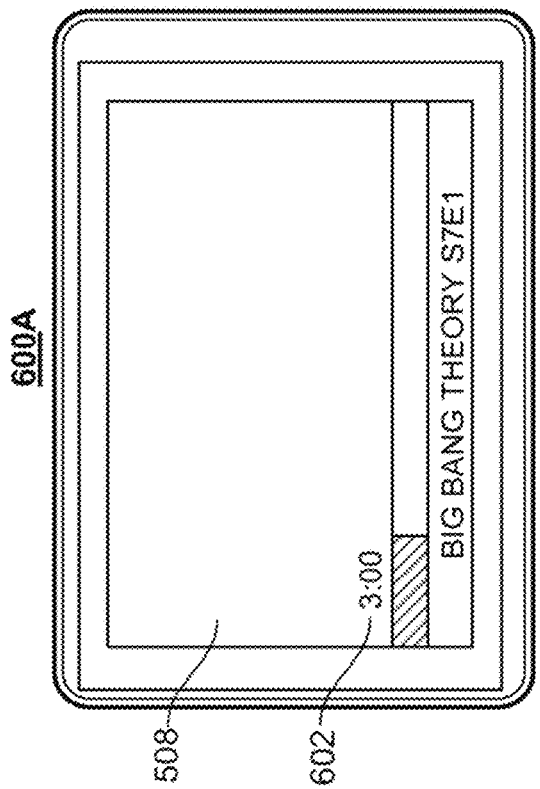
FIG. 6C shows an illustrative embodiment of the display of user equipment displaying exemplary options for setting a skip-forward time duration, in accordance with some embodiments of the disclosure.

FIG. 6C shows an illustrative embodiment of the display of user equipment displaying exemplary options for setting a skip-forward time duration, in accordance with some embodiments of the disclosure. For example, control circuitry 304 generates for display option 624 (e.g., a one-minute skip-forward time duration), 648 (e.g., a two-minute skip-forward time duration), option 644 (e.g., a five-minute skip-forward time duration), and option 650 (e.g., an option which allows the user to set a manual skip-forward time duration). As previously described, control circuitry 304 then receives a selection of one of the available options and uses the associated time duration for setting the skip-forward time duration for media asset 508.

In some embodiments, control circuitry 304 retrieves the user-specified time duration. For example, upon receiving the skip-forward command, control circuitry reads data stored in storage 308 to determine the user-specified time duration and determines that the skip-forward time duration is set to five minutes. In some embodiments, control circuitry 304 determines whether storage 308 contains the user-specified time duration associated with the media asset currently being viewed. In some embodiments, should control circuitry 304 determine that a user-specified time duration has not been associated with the asset currently being viewed, control circuitry 304 determines whether storage 308 contains a user-specified time duration that may be applied as a default. For example, before the user issued the skip-forward command, control circuitry 304 may receive a user input specifying that a default user time duration for skip-forwarding should be set to five minutes. In a different example, should control circuitry 304 determine that a default user time duration for skip-forwarding is unavailable (e.g., because it has not been set for the particular media asset being viewed), control circuitry 304 determines a default system time duration for skip-forwarding. The default system time duration for skip-forwarding may be configured by the provider of control circuitry 304.

In some embodiments, when control circuitry 304 determines that a user-specified time duration is unavailable (e.g., because it has not been set for the particular media asset being viewed), control circuitry 304 determines the last-used time duration. For example, when control circuitry 304 queries a user profile stored in storage 308 to determine the most recent media asset viewed by the user, control circuitry 304 then determines whether control circuitry 304 had previously associated a time duration with media asset 508. If control circuitry 304 determines that a time duration is not available for the asset that has been most recently viewed by the user, control circuitry 304 may query the user profile to determine the next most recent media asset viewed by the user. Control circuitry 304 may continue this process until control circuitry determines a media asset with an associated time duration.

In some embodiments, control circuitry 304 receives a user-specified time duration from a user input interface 310. For example, control circuitry 304 detects that a user has issued a skip-forward command on a remote control. Control circuitry 304 then monitors for a second user input, such as a numerical input originating from a key on the number pad of the remote control. Control circuitry 304 may set the time duration based on the received numerical input without displaying further information on display 312.

In some embodiments, control circuitry 304 determines an expected overshoot value. For example, control circuitry 304 queries a media guidance data source 422 using communications network 414 to determine that the average duration of time by which users viewing media asset 508 (e.g., the episode of "The Big Bang Theory") tend to overshoot after invoking a skip-forward command (e.g., fast forwarding) is equal to one minute. Control circuitry may determine this duration of time by analyzing a log stored in media guidance data source 422 listing the duration of each rewind operation issued by each user that has viewed media asset 508, because a rewind operation following a skip-forward operation may be indicative of a user attempting to compensate for a resultant overshoot. Control circuitry 304 may maintain such a log by monitoring for skip-forward operations and rewind operations requested by each user viewing media assets from media content source 416. Control circuitry may interpret each rewind operation as an overshoot value. In another example, control circuitry 304 calculates an expected overshoot value based on data contained in a user profile associated with the user, which may be stored in storage 308. Control circuitry 304 may analyze the user profile and determine that the user profile contains a log of each rewind operation which follows a skip-forward operation. Control circuitry 304 may then determine an expected overshoot value by averaging a set or subset of time durations associated with rewind operations following skip-forward operations. As will be further described in relation to FIG. 9, control circuitry 304 may utilize crowd-sourcing data to determine an expected overshoot value, as will be described in more detail below. In a different example, control circuitry 304 calculates the overshoot value based on the average overshoot associated with media asset 508 which the control circuitry 304 is currently generating for display. Similarly, as will be discussed further in relation to FIG. 13, control circuitry 304 may calculate the overshoot value based on overshoot values associated with all media assets that the user has viewed in the past. In a last example, control circuitry 304 calculates the overshoot value based on the type or genre of media asset that the control circuitry is currently generating for display, which is further discussed in relation to FIG. 12.

In some embodiments, control circuitry 304 calculates a new location in the media asset 508 that is advanced from a current location based on the user-specified time duration and the expected overshoot value. For example, while generating a media asset 508 (e.g., the episode of "The Big Bang Theory") for display, control circuitry 304 determines that the user-specified time duration has been set to five minutes. Control circuitry 304 may then determine that the expected overshoot value is set to one minute. Control circuitry 304 may then calculate a new location in the media asset 508 by subtracting the expected overshoot value (e.g., one minute) from the user-specified time duration (e.g., five minutes), thus setting the new location to the result of the calculation (e.g., four minutes from the current location in the media asset).

In some embodiments, control circuitry 304 calculates a new location in the media asset 508 that is advanced from a current location based on the user-specified time duration, the expected overshoot value, and the content of media asset 508 at the new location. For example, while generating a media asset 508 (e.g., the episode of "The Big Bang Theory") for display, control circuitry 304 determines that the user-specified time duration has been set to five minutes. Control circuitry 304 may then determine that the expected overshoot value is set to one minute. Control circuitry 304 may then calculate a new location in the media asset 508 by subtracting the expected overshoot value (e.g., one minute) from the user-specified time duration (e.g., five minutes), thus setting the new location to the result of the calculation. Control circuitry 304 may then determine whether the content of the media asset 508 at the new location is a commercial. For example, control circuitry 304 analyzes data associated with media asset 508 to determine whether the content associated with the new location contains a reference to a commercial. Such data may include closed caption data, audio data, visual data, metadata, and the like. Control circuitry 304 may, in response to determining that the new location contains a commercial, proceed to determine a new location in media asset 508 by analyzing data associated with each subsequent location. For example, control circuitry 304 determines a subsequent location by incrementing the location by one second. Control circuitry 304 may then determine whether content associated with the subsequent location still contains a reference to a commercial, as described above. When control circuitry 304 reaches a particular location that no longer contains a commercial, control circuitry 304 may set the particular location as the new location in media asset 508.

Figure 6D:
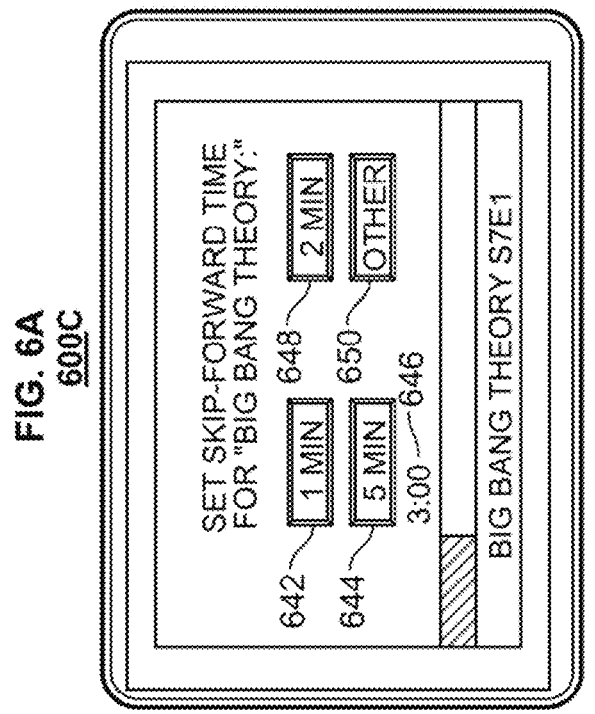
FIG. 6D shows an illustrative embodiment of the display of user equipment after the conclusion of a skip-forward operation, in accordance with some embodiments of the disclosure.

FIG. 6D shows an illustrative embodiment of the display of user equipment after the conclusion of a skip-forward operation, in accordance with some embodiments of the disclosure. Control circuitry 304 may generate an informative message 662 indicating that a skip-forward time duration has been set for media asset 508. Additionally, control circuitry 304 may indicate that control circuitry 304 advanced playback by a specific number of minutes (e.g., four minutes). Control circuitry 304 may display indicators marking first time 602 and skip-forward end location 666, corresponding to the start (e.g., three minutes) and end (e.g., seven minutes) locations of the skip-forward operation, respectively.

In some embodiments, control circuitry 304 plays back the media asset 508 starting from the new location, corresponding to skip-forward end location 666, at a speed greater than normal playback speed. For example, after control circuitry 304 determines the new location (e.g., a location that is four minutes advanced in the media asset), control circuitry 304 skips to the new location. After skipping forward to the new location, control circuitry 304 may display, at a second time 668 (e.g., nine minutes and thirty seconds from the start of media asset playback) a second informative message 688 (e.g., indicating that playback of media asset 508 at a normal speed may be resumed by pressing the "play" button). Control circuitry 304 may control the playback of media asset 508 so that playback occurs at a speed greater than normal speed (e.g., a speed twice as fast as normal playback speed) until an input from the user is received. Alternatively, control circuitry 304 may continue playback of media asset 508 at the greater speed until a location corresponding to the overshoot value offset, as measured from the skip-forward end location 666, and control circuitry 304 may then, without further user input, resume playback of media asset 508 at a normal speed.

Figure 7B:
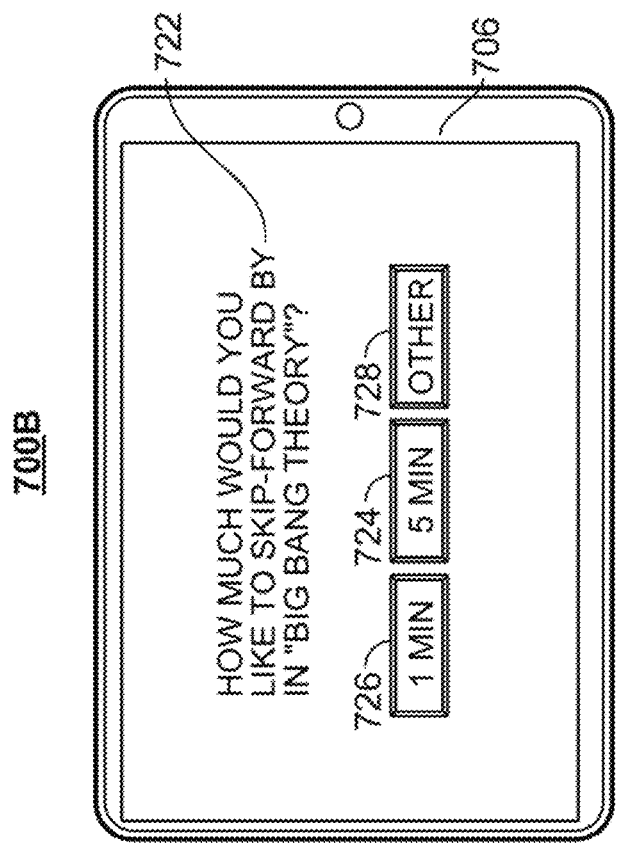
FIG. 7B shows an illustrative embodiment of the display of a wireless communications device used for displaying available skip-forwarding time durations for a media asset displayed on user television equipment, in accordance with some embodiments of the disclosure.
Figure 7A:
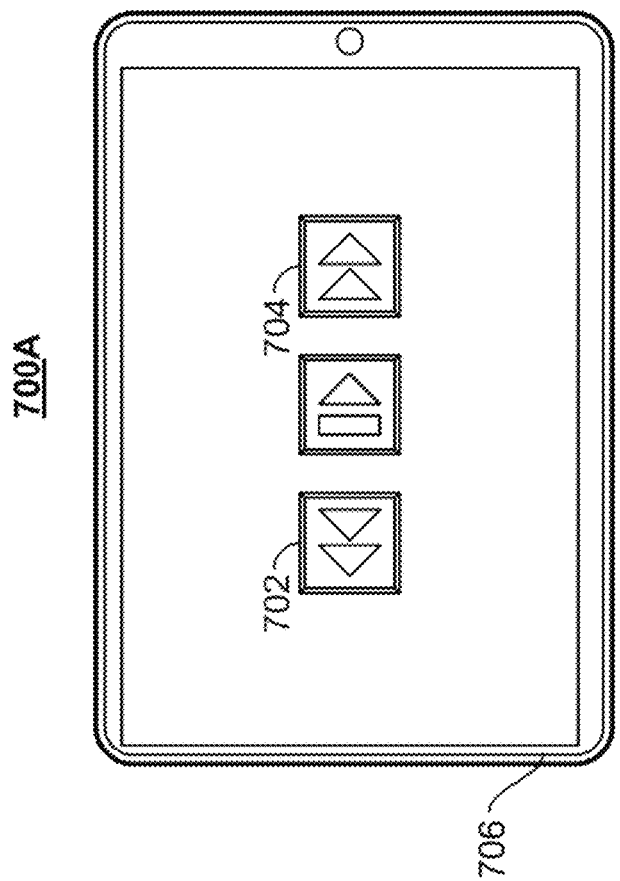
FIG. 7A shows an illustrative embodiment of the display of a wireless communications device used for issuing a skip-forwarding operation in order to advance through a media asset displayed on user television equipment, in accordance with some

FIG. 7A shows an illustrative embodiment of the display of a wireless user communications device 406 used for issuing a skip-forwarding operation in order to advance through a media asset 508 displayed on user television equipment 402, in accordance with some embodiments of the disclosure. User equipment 706 is depicted as the display 312 of wireless user communications device 406, but may be the display of any user equipment device that is separate from user television equipment 402, such as user computer equipment 404.

In some embodiments, control circuitry 304 generates for display a video corresponding to media asset 508 on display 312 of user television equipment 402 media asset 508. Control circuitry 304 may be networked with both user television equipment 402 and user equipment 706, using communications network 414. Control circuitry 304 may receive, using user input interface 310 of wireless user communications device 406, a user request to skip forward through media asset 508. Control circuitry 304 may then generate for display on the display 312 of the wireless user communications device 406, which is an example of a wireless user communications device 406, a skip-back button 702 and a skip-forward button 704 on the display 312. In this example, wireless user communications device 406 is depicted as tablet equipped with a touch screen interface embedded in display 312.

FIG. 7B shows an illustrative embodiment of the display of a wireless user communications device 406 used for displaying available skip-forwarding time durations for media asset 508 displayed on user television equipment 402, in accordance with some embodiments of the disclosure. In some embodiments, control circuitry 304 determines whether a skip-forward time duration for media asset 508 has previously been set by the user. If control circuitry 304 determines that it has not received such a skip-forward time duration, control circuitry 304 may generate for display, on display 312 of wireless user communications device 406, an informative message 722 which requests that the user provides a skip-forward time duration for media asset 508. Control circuitry 304 may further generate for display a first skip-forward time duration option 726 (e.g., for skipping forward by one minute), a second skip-forward time duration option 724 (e.g., for skipping forward by five minutes), and a third skip-forward time duration option 728 (e.g., for skipping forward by a custom amount of minutes). After generating options 724, 726, and 728, control circuitry 304 may detect user input selecting one of the options. For example, control circuitry 304 detects that the user, using user input interface 310 of user equipment 706, selected the second skip-forward time duration option 724 (e.g., for skipping forward by five minutes). Control circuitry 304 may then continue the skip-forwarding process, as previously described.

Figure 8:
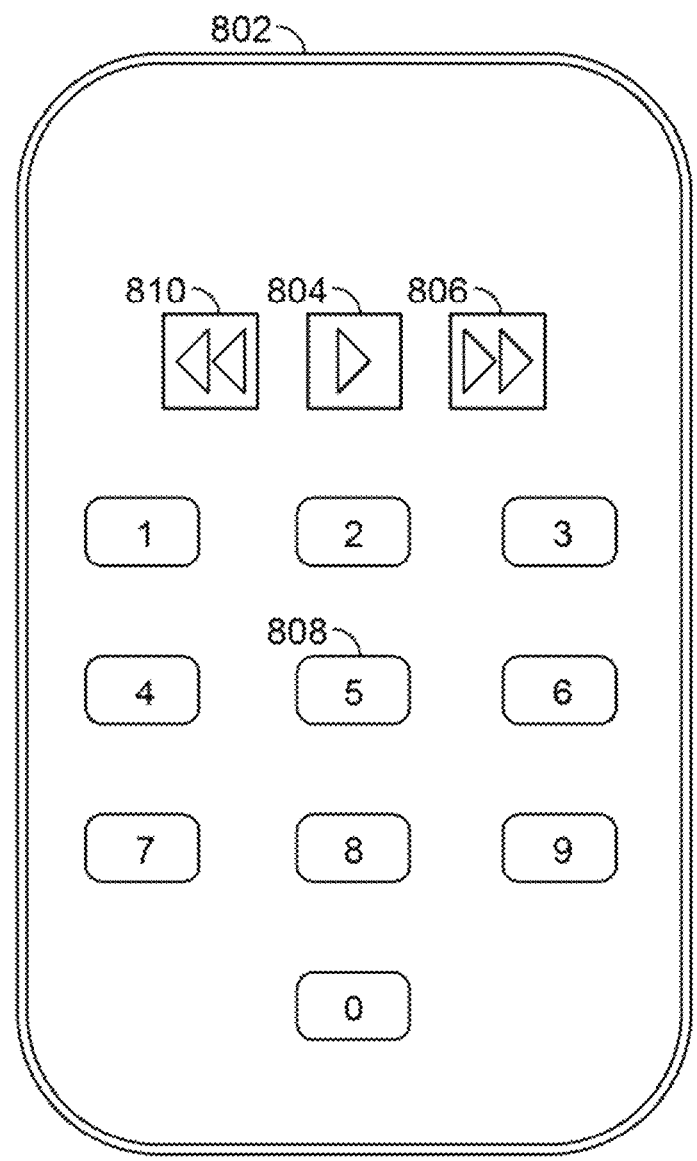
FIG. 8 shows an illustrative embodiment of a remote control used for issuing skip-forward commands, in accordance with some embodiments of the disclosure.

FIG. 8 shows an illustrative embodiment of a remote control 802 used for issuing skip-forward commands, in accordance with some embodiments of the disclosure. Remote control 802 is depicted as a dedicated device, but may also be implemented on any device equipped with a user input interface 310, such as a wireless user communications device 406. Control circuitry 304 may establish a connection between user equipment 502 and remote control 802 using communications network 414. Remote control 802 may include various buttons enabling a user to enter commands, such as skip-back remote control button 810, play button 804, and skip-forward remote control button 806. Remote control 802 may also include buttons corresponding to keys of a number pad, including, for example, a number key 808 (e.g., the depression of which corresponds to the input of the number five).

In some embodiments, control circuitry 304 detects commands issued using remote control 802 by the user. For example, control circuitry 304 detects whether the user issues a skip-forward command using skip-forward remote control button 806 during playback of media asset 508. In some embodiments, control circuitry 304 determines that the user has not provided a skip-forward time duration associated with media asset 508, and thus control circuitry 304 waits for further input from the user before initiating the skip-forward function (e.g., a selection of a number button on remote control 802, indicative of the desired time duration). Control circuitry 304 may then detect that the user issued the command associated with the number key 808, indicating that he or she wishes to skip forward by five minutes through media asset 508. Control circuitry 304, upon receiving the input from remote control 802 corresponding to the number key 808, may proceed to skip forward through media asset 508, as previously described.

In some embodiments, control circuitry 304 detects whether the user issues a skip-forward command using skip-forward remote control button 806 during playback of media asset 508. In some embodiments, control circuitry 304 then determines whether a skip-forward time duration for the media asset has previously been set. If control circuitry 304 determines that a skip-forward time duration has been set, control circuitry 304 may proceed to skip forward through media asset 508 immediately, without determining whether any other input is received, based on the previously set skip-forward time duration.

Figure 9:
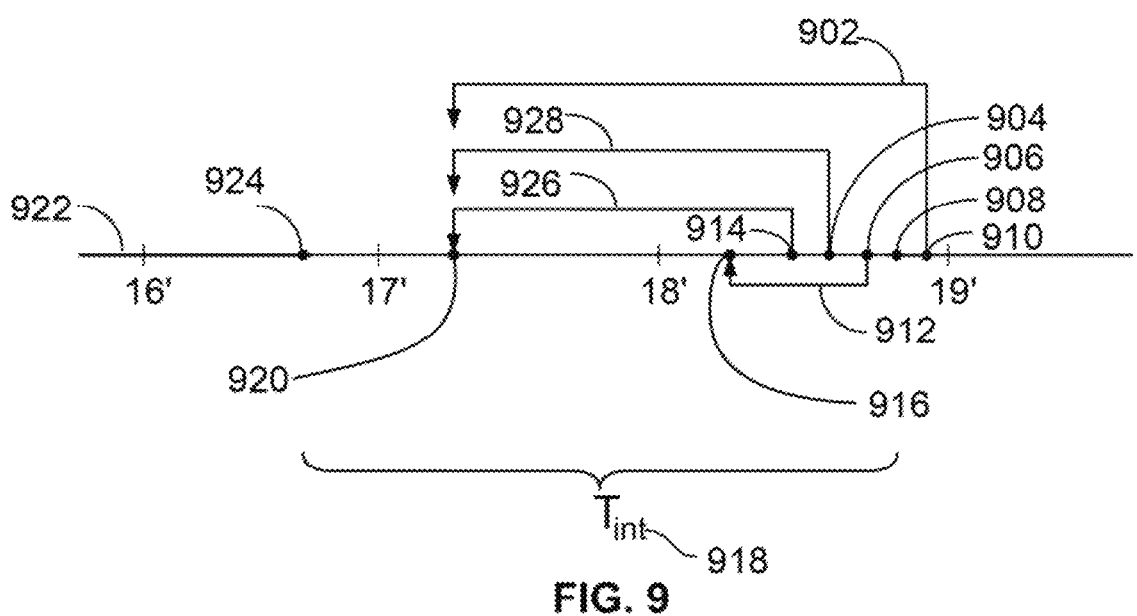
FIG. 9 shows a plot of crowdsourced data used for determining an expected overshoot value, in accordance with some embodiments of the disclosure.

FIG. 9 shows a plot of crowdsourced data used for determining an expected overshoot value, in accordance with some embodiments of the disclosure. The playback of media asset 508 between minute 16 and 19, as measured from the start of playback of media asset 508, is depicted on timeline 922. The location in the playback of media asset 508 at the moment when control circuitry 304 receives a request to skip forward through media asset 508 is depicted as location 924 on timeline 922.

In some embodiments, at location 924 (e.g., a specific time between minute 16 and minute 17 as measured from the start of playback of media asset 508), control circuitry 304 receives input from a user specifying a time duration to associate with a skip-forward command. For example, control circuitry 304 determines based on the input that the user wishes to skip forward to location 908 (e.g., a specific time between minutes 18 and 19 as measured from the start of playback of media asset 508).

In some embodiments, control circuitry 304 determines an expected overshoot value to associate with the skip-forward command using crowdsourced data. For example, control circuitry 304 connects to media guidance data source 418 using communications network 414 to query a crowdsourcing database containing crowdsourced data associated with specific media assets. For example, in the case of media asset 508, the crowdsourcing database contains data based on commands issued by each user that viewed media asset 508, as well as timestamps associated with the start and end locations of each command, with respect to the beginning of playback of media asset 508. Such commands may include skip-forward commands, skip-back commands, pause commands, play commands, and the like. Control circuitry 304 may collect crowdsourcing data from each user that has previously viewed media assets from media content source 416 using user television equipment 402, user computer equipment 404, and wireless user communications device 406, by way of communications network 414.

In some embodiments, control circuitry 304 determines all entries in the crowdsourcing database that contain data detailing skip-forward operations ending within a time interval 918 for searching crowdsourced overshoot offset data in media asset 508. Control circuitry 304 defines the time interval 918 for searching crowdsourced overshoot offset data to identify only those skip-forward operations crowdsourced in media asset 508 which terminated reasonably close in time to the user's skip-forward location 908. Control circuitry 304 may define the time interval for searching crowdsourced overshoot offset data in various ways. For example, control circuitry 304 calculates the time interval for searching crowdsourced overshoot offset data as the average time duration of all rewind operations logged in the crowdsourcing database occurring in media asset 508 (e.g., two minutes and ten seconds) in which the rewind operation is preceded by a skip-forward operation.

In some embodiments, control circuitry 304 identifies all skip-forward operations that had terminated within the determined time interval 918, $T_{int}$ for searching crowdsourced overshoot offset data. Additionally, from the identified set of skip-forward operations, control circuitry 304 may identify only those skip-forward operations which are associated with a rewind operation taking place immediately after each skip-forward operations. For example, control circuitry 304 determines a first rewind operation 902, associated with a first skip-forward end location 910 and a rewind end location 920. Control circuitry 304 may further identify a second rewind operation 928, associated with a second skip-forward end location 904 and a rewind end location 916, a third rewind operation 926, associated with a third skip-forward end location 914 and a rewind end location 916, as well as a fourth rewind operation 912, associated with a fourth skip-forward end location 906, and a rewind end location 916.

In some embodiments, control circuitry 304 identifies, based on crowdsourcing data associated with media asset 508, each location in the media asset 508 to which users frequently rewind, having previously skipped forward to a location in media asset 508 that is within the determined time interval 918 $T_{int}$. This location may signify a change in the scene, the start or end of a block of commercials, or any other event, the occurrence of which may be of interest to the user. Control circuitry 304 may utilize various clustering algorithms to identify a location or range of locations in media asset 508 to which users rewound, having previously skip-forwarded to a location within the determined time interval 918 for searching crowdsourced overshoot offset data. For example, control circuitry 304 forms a first cluster by determining that users who issued skip-forward operations terminating at locations 914, 928, and 902, then proceeded to rewind through media asset 508 to a rewind end location 916. Similarly, control circuitry 304 may form a second cluster by determining that a user who issued a skip-forward operation ending at location 906 proceeded to rewind through media asset 508 to rewind end location 914.

In some embodiments, control circuitry 304 determines the cluster with the greatest cluster significance value. A cluster significance value may indicate the number of crowdsourced skip-forward operations which terminated at a given cluster. For example, control circuitry 304 determines that the cluster significance value of the rewind end location 914 (e.g., corresponding to the terminating location of rewind operation 902, 926, and 928) is equal to three, as three crowdsourced rewind operations terminate at the cluster corresponding to rewind end location 920. Similarly, control circuitry 304 may determine that the cluster significance value of rewind end location 914 is equal to one, as only one crowdsourced rewind operation terminates at the cluster corresponding to rewind end location 920.

In some embodiments, control circuitry 304 calculates a new location in media asset 508 that is advanced from location 924 in the playback of media asset 508, based on the skip-forward location 908 and the location of the cluster with the greatest significance value. For example, control circuitry 304 determines that rewind end location 920 is associated with a cluster with the greatest cluster significance value. Control circuitry 304 may then set the new location in media asset 508 based on rewind end location 920.

Figure 10:
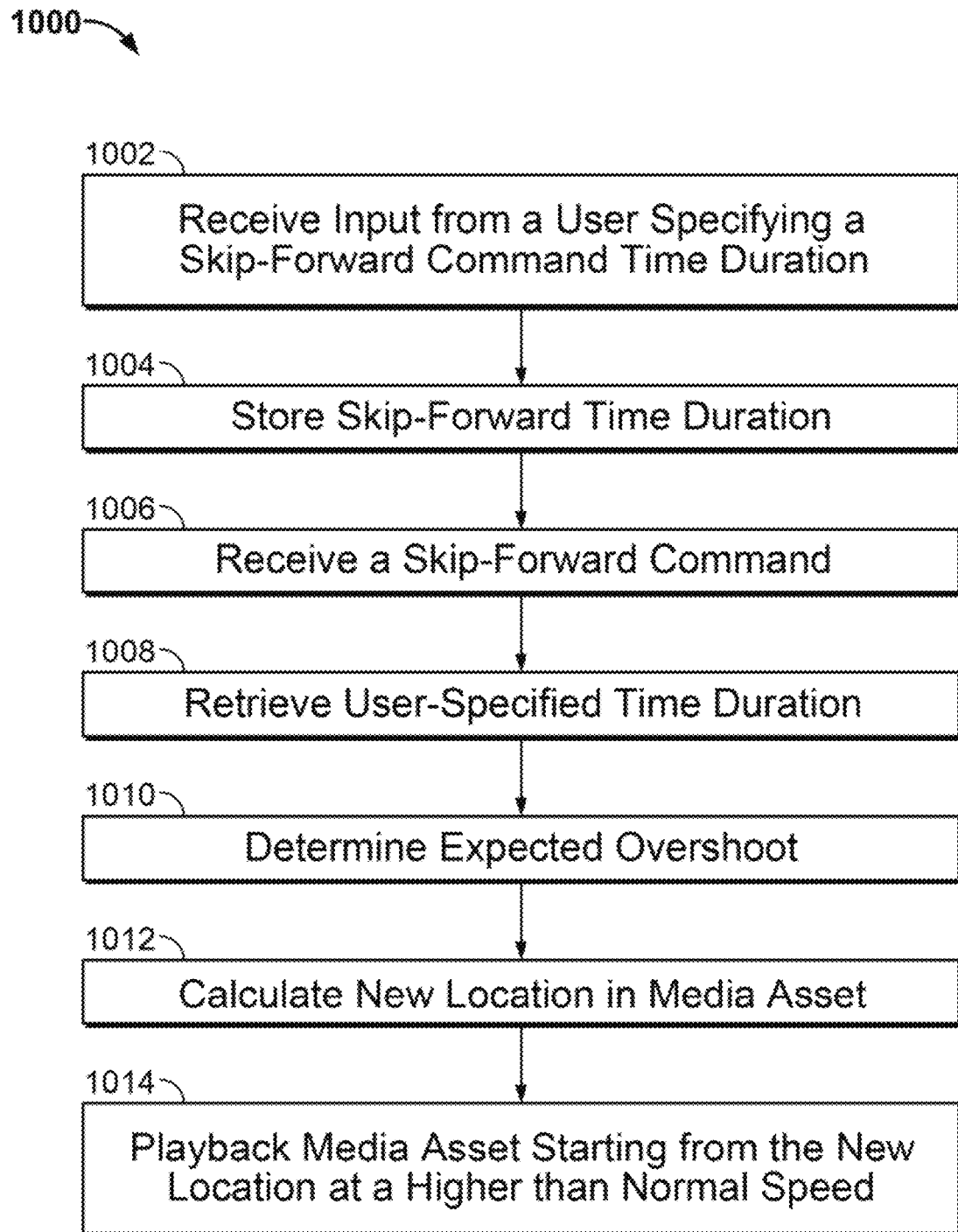
FIG. 10 shows a flowchart of illustrative steps involved in executing a skip-forward operation, in accordance with some embodiments of the disclosure.

FIG. 10 shows a flowchart of illustrative steps involved in executing a skip-forward operation, in accordance with some embodiments of the disclosure. It should be noted that process 1000 or any step thereof could be performed on, or provided by, any of the devices shown in FIGS. 3-6. For example, process 1000 may be executed by control circuitry 304 (FIG. 3) as instructed by control circuitry implemented on user equipment 402, 404, and/or 406 (FIG. 4) in order to execute a skip-forward operation. In addition, one or more steps of process 1000 may be incorporated into or combined with one or more steps of any other process or embodiment.

Process 1000 begins at 1002, where control circuitry 304, while generating for display media asset 508 (e.g., an episode of the "The Big Bang Theory") on user equipment 502, receives input from a user input interface 310 specifying a time duration to associate with a skip-forward command. Media asset 508 is, for example, broadcast television video, Internet video, on-demand video, or video from any other source. User equipment 502 may be user television equipment 402, user computer equipment 404 or wireless user communications device 406. Control circuitry 304 displays the time duration input window 504 in order to instruct the user to specify a time duration for skip-forwarding through a media asset. The time duration input window 504 displays selectable options allowing the user to specify a skip-forward time duration. For example, time duration input window displays a first option 512 (e.g., a one-minute time duration option), a second option 506 (e.g., a five-minute time duration option), and a third option 510 (e.g., for allowing the user to manually select the time duration). Based on the user selection of an option (e.g., second option 506), control circuitry 304 receives, by way of user input interface 310, an input specifying an exact time duration to associate with a skip-forward command (e.g., five minutes).

At 1004, control circuitry 304 stores the skip-forward time duration. In one example, control circuitry 304 stores the time duration in storage 308, such as a hard disk associated with a user equipment device 502. Furthermore, control circuitry 304 associates the received time duration with media asset 508 that control circuitry 304 is generating for display. For example, control circuitry 304 associates a duration of time input of five minutes with a media asset 508 (e.g., the episode of "The Big Bang Theory"). When storing the time duration, control circuitry 304 associates a genre (e.g., "comedy series") corresponding to the media asset 508 (e.g., a streamed episode of "The Big Bang Theory"). In a different example, control circuitry 304 stores the received time duration in storage 308, as part of a user profile associated with the user.

At 1006, control circuitry 304 receives a skip-forward command during playback of media asset 508. For example, after viewing media asset 508 (e.g., the episode of "The Big Bang Theory") for three minutes, the user encounters a block of commercials in the playback of the media asset 508. As the user may be uninterested in viewing the block of commercials and instead may want to return to viewing the episode as quickly as possible, the user is able to issue a skip-forward command. Control circuitry 304 detects the skip-forward command by monitoring user input interface 310, which, in some embodiments is a remote control which control circuitry 304 has connected to via communications network 414. For example, control circuitry 304 detects, at a time 646 (e.g., three minutes following the start of media asset playback) that the user has depressed the button corresponding to the skip-forward operation on a remote control. In response to receiving a skip-forward command from the user, control circuitry 304 displays a first informative message 664 (e.g., indicating that the media asset will be advanced by five minutes).

At 1008, control circuitry 304 retrieves the user-specified time duration. For example, upon receiving the skip-forward command, control circuitry 304 reads data stored in storage 308 to determine the user-specified time duration associated with media asset 508 and determines that the skip-forward time duration is set to five minutes. In some embodiments, control circuitry 304 determines whether storage 308 contains the user-specified time duration associated with media asset 508 currently being generated for display on equipment device 502. In some embodiments, should control circuitry 304 determine that a user-specified time duration has not been associated with the media asset 508 currently being viewed, control circuitry 304 determines whether storage 308 contains a user-specified time duration that may be applied as a default to any asset without an associated user-specified time duration.

At 1010, control circuitry 304 determines the expected overshoot value. For example, control circuitry 304 queries a media guidance data source 422 using communications network 414 to determine that the average duration of time by which users viewing the media asset (e.g., the episode of "The Big Bang Theory") tend to overshoot after invoking a skip-forward command (e.g., fast forwarding) is equal to one minute. Control circuitry 304 determines this duration of time by analyzing a log listing the duration of each rewind operation issued by each user subsequent to (and in close proximity to) a skip-forward command. In this example, control circuitry 304 interprets an immediate rewind operation following a skip-forward operation as evidence of a user attempting to compensate for a resultant overshoot. In another example, control circuitry 304 determines an expected overshoot value based on data contained in a user profile associated with the user, which is be stored in storage 308. Control circuitry 304 analyzes the user profile and determines that the user profile contains a log of each rewind operation which follows a skip-forward operation. Control circuitry 304 determines an expected overshoot value by averaging a set or subset of time durations associated with rewind operations following skip-forward operations. In another example, control circuitry 304, using data retrieved from media guidance data source 422, determines that media asset 508 is part of a series. The control circuitry may then determine the average overshoot value associated with one or more episodes of the series. Control circuitry 304 may also utilize crowd-sourcing to determine an expected overshoot value. In a last example, control circuitry 304 receives, from media guidance data source 422, the average duration of time by which users viewing the media asset tend to overshoot after invoking a skip-forward command.

At 1012, control circuitry 304 calculates a new location in the media asset 508 that is advanced from a current location based on the user-specified time duration and the expected overshoot value. For example, while generating a media asset 508 (e.g., the episode of "The Big Bang Theory") for display, control circuitry 304 determines that the user-specified time duration has been set to five minutes. Control circuitry 304 then determines that the expected overshoot value is set to one minute. Control circuitry 304 then calculates a new location in the media asset 508 by subtracting the expected overshoot value (e.g., one minute) from the user-specified time duration (e.g., five minutes), thus setting the new location based on the result of the calculation (e.g., four minutes from the current location in the media asset).

At 1014, control circuitry 304 plays back the media asset 508 starting from the new location at a speed greater than normal playback speed. For example, after control circuitry 304 determines the new location (e.g., a location that is four minutes advanced in the media asset), control circuitry 304 skips to the new location. Control circuitry 304 then continues playing back media asset 508 at a speed greater than normal playback speed (e.g., a speed twice as fast as normal playback speed) until an input from the user is received. Alternatively, control circuitry 304 continues playback of media asset 508 at the greater speed until a location corresponding to the skip-forward time duration, as measured from the first time 602, and upon reaching the location corresponding to the skip-forward time duration, control circuitry 304, without further user input, resumes playback of media asset 508 at a normal speed.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method.

Figure 11:
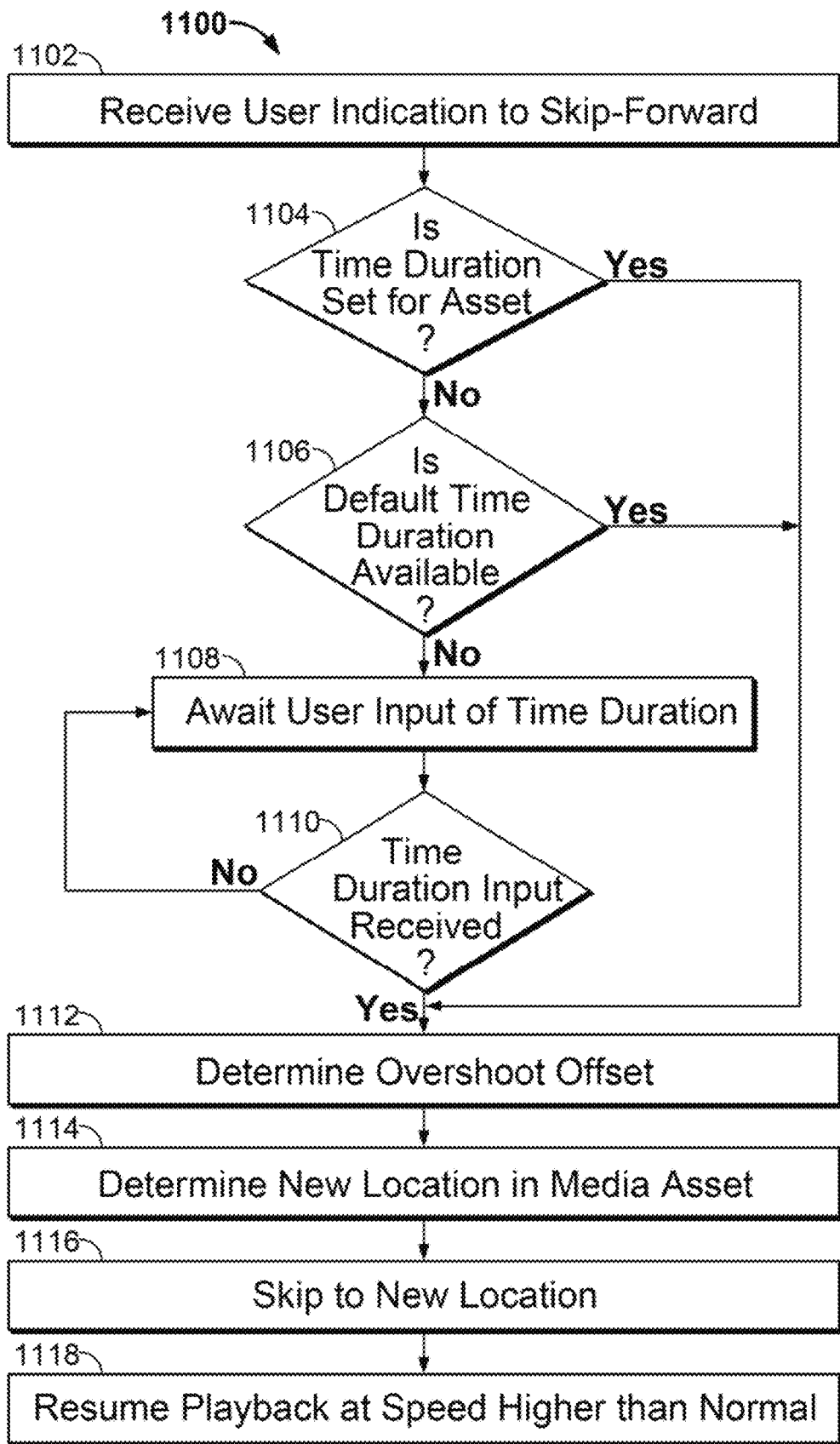
FIG. 11 shows a flowchart of illustrative steps involved in determining a skip-forward time duration when executing a skip-forward operation in a media asset, in accordance with some embodiments of the disclosure.

FIG. 11 shows a flowchart of illustrative steps involved in determining a skip-forward time duration when executing a skip-forward operation in a media asset, in accordance with some embodiments of the disclosure. It should be noted that process 1100 or any step thereof could be performed on, or provided by, any of the devices shown in FIGS. 3-6. For example, process 1100 may be executed by control circuitry 304 (FIG. 3) as instructed by control circuitry implemented on user equipment 402, 404, and/or 406 (FIG. 4) in order to determine a skip-forward time duration when executing a skip-forward operation in a media asset. In addition, one or more steps of process 1100 may be incorporated into or combined with one or more steps of any other process or embodiment.

Process 1100 begins at 1102, where control circuitry 304, while generating for display media asset 508 (e.g., an episode of the "The Big Bang Theory") on user equipment 502, receives input from a user input interface 310 to skip forward through media asset 508.

At 1104, control circuitry 304 determines whether a skip-forward time duration has been previously set for media asset 508. For example, control circuitry 304 queries a database stored in storage 308 to identify a profile associated with the user. The profile contains a listing of media assets that the user had previously watched, and the skip-forward time durations for each media asset in which control circuitry 304 received and stored a user request for setting a skip-forward time duration. Should control circuitry 304 determine that a skip-forward time duration had previously been stored for media asset 508, process 1100 continues to 1112.

If control circuitry 304 determines that a skip-forward time duration has not been previously set for media asset 508, process 1100 continues to 1106. At 1106, control circuitry 304 determines whether a default skip-forward time duration is available. Control circuitry 304 uses the default skip-forward time duration if the user does not elect to input a time-duration for an asset. For example, control circuitry queries a database stored in storage 308 to identify a profile associated with the user. The profile contains default settings that control circuitry 304 will use when a media asset specific setting has not been set by the user. For example, control circuitry 304 determines that a default time duration setting is saved in the user profile, and that it is set to three minutes. Should control circuitry 304 determine that a default skip-forward time duration is available, process 1100 continues to 1112.

If control circuitry 304 determines that a skip-forward time duration has not been previously set for media asset 508, process 1110 continues to 1108. At 1108, control circuitry 304 waits for user input of time duration. Control circuitry 304 periodically checks to determine whether a time duration has been entered. For example, control circuitry 304 detects that a time duration has been entered when the user selects option 644 (e.g., the option corresponding to a five-minute time duration). If a time duration input is received, process 1100 continues to 1112. If a time duration input is not received, process 1100 continues to 1108.

At 1112, control circuitry 304 determines the expected overshoot value. For example, control circuitry 304 queries a media guidance data source 422 using communications network 414 to determine that the average duration of time by which users viewing the media asset (e.g., the episode of "The Big Bang Theory") tend to overshoot after invoking a skip-forward command (e.g., fast forwarding) is equal to one minute. Control circuitry determines this duration of time by analyzing a log listing the duration of each rewind operation issued by each user subsequent to (and in close proximity to) a skip-forward command. In this example, control circuitry 304 interprets an immediate rewind operation following a skip-forward operation as evidence of a user attempting to compensate for a resultant overshoot. In another example, control circuitry 304 determines an expected overshoot value based on data contained in a user profile associated with the user, which is be stored in storage 308. Control circuitry 304 analyzes the user profile and determines that the user profile contains a log of each rewind operation which follows a skip-forward operation. Control circuitry 304 determines an expected overshoot value by averaging a set or subset of time durations associated with rewind operations following skip-forward operations. Alternatively, control circuitry 304 utilizes crowd-sourcing to determine an expected overshoot value.

At 1114, control circuitry 304 calculates a new location in the media asset 508 that is advanced from a current location based on the user-specified time duration and the expected overshoot value. For example, while generating a media asset 508 (e.g., the episode of "The Big Bang Theory") for display, control circuitry 304 determines that the user-specified time duration has been set to five minutes. Control circuitry 304 then determines that the expected overshoot value is set to one minute. Control circuitry 304 then calculates a new location in the media asset 508 by subtracting the expected overshoot value (e.g., one minute) from the user-specified time duration (e.g., five minutes), thus setting the new location based on result of the calculation (e.g., four minutes from the current location in the media asset).

At 1116, control circuitry 304 skips forward to the new location determined at 1114. For example, control circuitry 304 determines the new location corresponds to skip-forward end location 666.

At 1118, control circuitry 304 plays back the media asset 508, resuming from the new location at a speed greater than normal playback speed. For example, after control circuitry 304 determines the new location (e.g., a location that is four minutes advanced in the media asset 508), control circuitry 304 skips to the new location. Control circuitry 304 then continues playing back media asset 508 at a speed greater than normal playback speed (e.g., a speed twice as fast as normal playback speed) until an input from the user is received.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method.

Figure 12:
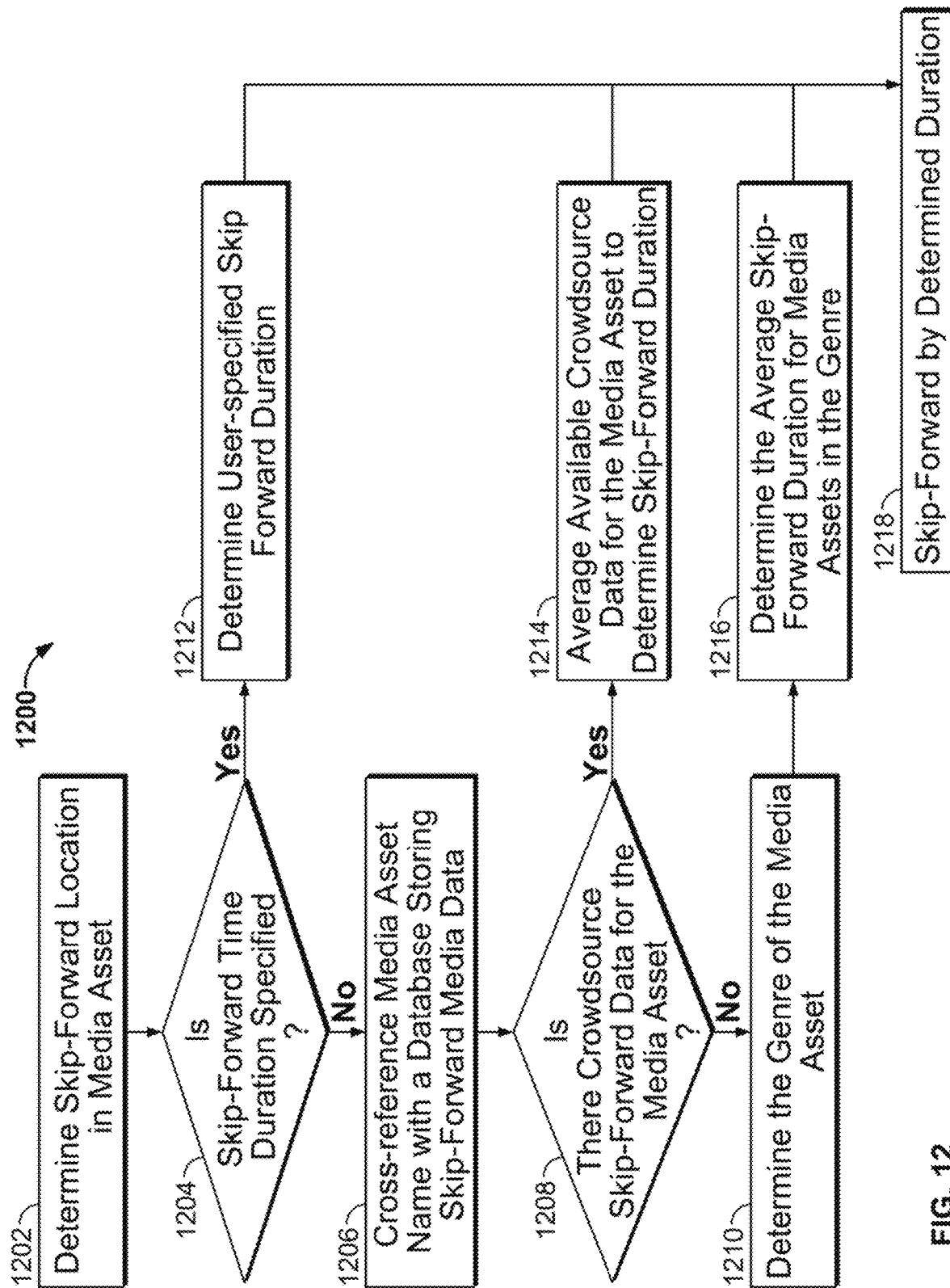
FIG. 12 shows a flowchart of illustrative steps involved in determining a skip-forward time duration based on crowdsourced data, in accordance with some embodiments of the disclosure.

FIG. 12 shows a flowchart of illustrative steps involved in determining a skip-forward time duration based on crowdsourced data, in accordance with some embodiments of the disclosure. It should be noted that process 1200 or any step thereof could be performed on, or provided by, any of the devices shown in FIGS. 3-6. For example, process 1200 may be executed by control circuitry 304 (FIG. 3) as instructed by control circuitry implemented on user equipment 402, 404, and/or 406 (FIG. 4) in order to determine a skip-forward time duration based on crowdsourced data. In addition, one or more steps of process 1200 may be incorporated into or combined with one or more steps of any other process or embodiment.

Process 1200 begins at 1202, where control circuitry 304, while generating for display media asset 508 (e.g., an episode of the "The Big Bang Theory") on user equipment 502, receives input from a user input interface 310 indicating that the user wishes to execute a skip-forward command in order to advance playback of media asset 508. Media asset 508 is, for example, broadcast television video, Internet video, on-demand video, or video from any other source. User equipment 502 may be user television equipment 402, user computer equipment 404 or wireless user communications device 406.

At 1204 control circuitry 304 determines whether a skip-forward time duration for media asset 508 is specified. Control circuitry 304 queries a database of storage 308 in order to determine whether a skip-forward time duration for media asset 508 has previously been set by the user. Should control circuitry 304 determine that a skip-forward time duration is specified, process 1200 continues to 1212. If, on the other hand, control circuitry 304 determines that a skip-forward time duration for media asset 508 is unavailable (e.g., because it has not been set for the particular media asset being viewed), process 1200 continues to 1206.

At 1212, control circuitry 304 determines the skip-forward time duration. For example, control circuitry 304 queries a profile stored in storage 308 to determine the time duration associated with media asset 508. Process 1200 continues to 1218.

At 1206, control circuitry 304 cross-references the name of the media asset 508 (e.g., a streamed episode of "The Big Bang Theory"), with a database storing skip-forward data. For example, control circuitry 304 connects to media guidance data source 418 using communications network 414 to query a database stored in media guidance data source 418 listing crowdsourcing data for media assets. Process 1200 then continues to 1208.

At 1208, control circuitry 304 cross-references the full name of media asset 508 (e.g., "The Big Bang Theory, Season 7, Episode 1") to determine whether any crowdsourcing skip-forward data associated with media asset 508 can be identified. Should control circuitry 304 determine that crowdsourcing skip-forward data associated with media asset 508 is available in the database stored in media guidance data source 418, process 1200 continues to 1214. Otherwise, if control circuitry 304 does not identify any available crowdsourcing data for media asset 508, process 1200 continues to 1210.

At 1214, control circuitry 304 averages all available crowdsourcing skip-forward data for media asset 508 in order to determine a skip-forward duration. For example, control circuitry 304 queries a database stored in media guidance data source 418 to identify all crowdsourcing records associated with media asset 508 that contain skip-forward data. Control circuitry 304 then determines a count of the number of records available, and a sum of all skip-forward time durations. Finally, control circuitry 304 determines the average skip-forward time duration for media asset 508 by dividing the sum of all skip-forward time durations by the determined count.

At 1210, control circuitry 304 determines the genre of media asset 508. Control circuitry 304 uses communications network 414 to connect to media guidance data source 418 in order to query a database containing a collection of data for each media asset. For example, the database contains a title, producer, release year, and genre for each media asset. Control circuitry 304 queries the genre of media asset 508 (e.g., a recording of an episode of "The Big Bang Theory"). For example, control circuitry 304 determines, using media guidance data source 418, that the genre of media asset 508 (e.g., a recording of an episode of "The Big Bang Theory") is "comedy series." Process 1200 then continues to 1216.

At 1216, control circuitry 304 determines the average skip-forward duration for media assets in the determined genre. Control circuitry 304 queries a database stored in media guidance data source 418 to identify all crowdsourcing records associated with genre "comedy series" that contain skip-forward data. Control circuitry 304 then determines a count of the number of records available, and a sum of all skip-forward time durations. Finally, control circuitry 304 determines the average skip-forward time duration for media assets associated with the "comedy series" genre by dividing the sum of all skip-forward time durations by the determined count. Control circuitry 304 then sets the skip-forward time duration for media asset 508 based on the determined average. Process 1200 then continues to 1218.

At 1218, control circuitry 304 skips forward by the determined duration. For example, control circuitry 304 determines that the skip-forward time duration is five minutes. Control circuitry 304 then identifies the current playback location of media asset 508.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method.

Figure 13:
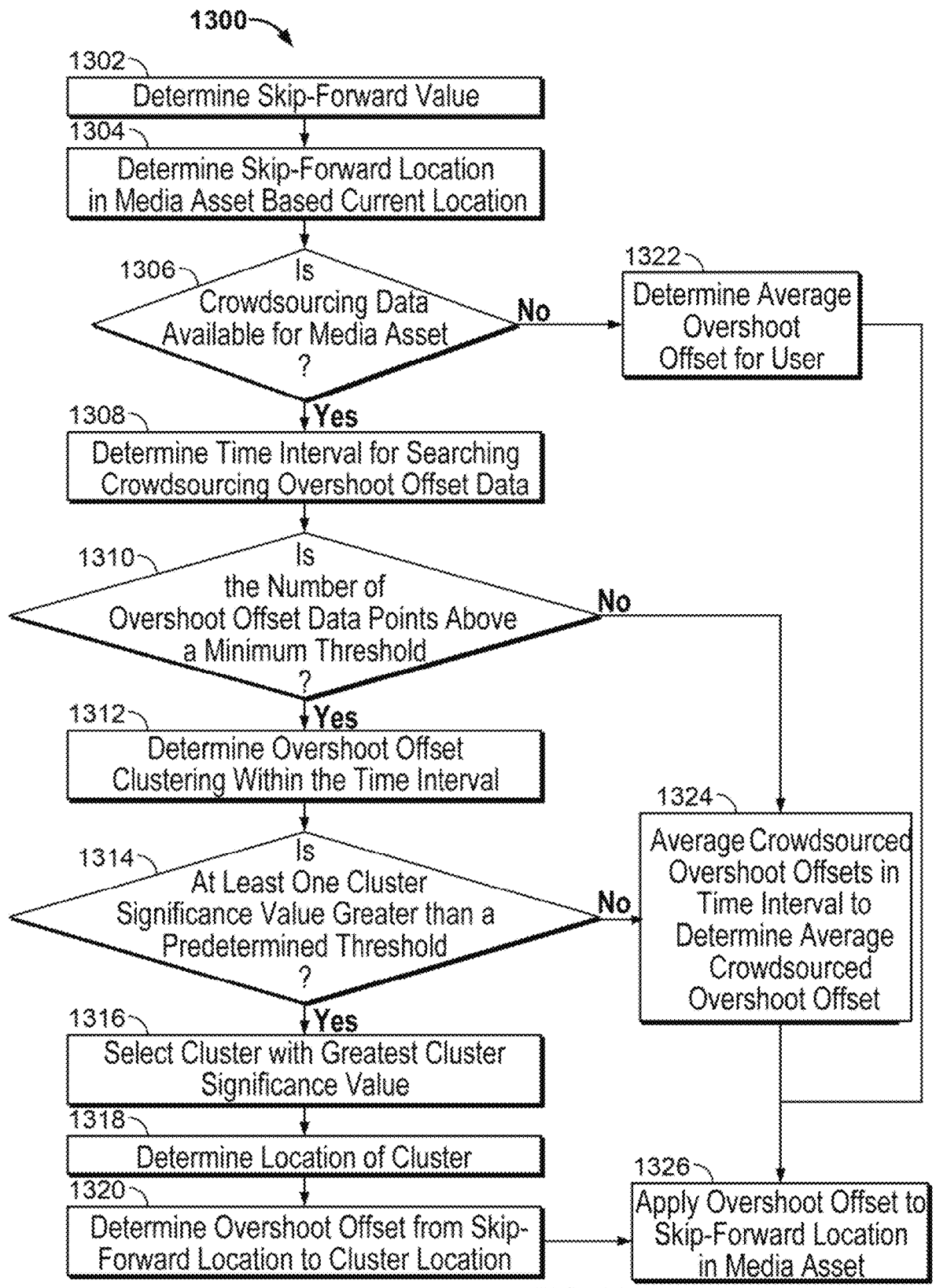
FIG. 13 shows a flowchart of illustrative steps involved in determining an overshoot offset using crowdsourced data, in accordance with some embodiments of the disclosure.

FIG. 13 shows a flowchart of illustrative steps involved in determining an overshoot offset using crowdsourced data, in accordance with some embodiments of the disclosure. It should be noted that process 1300 or any step thereof could be performed on, or provided by, any of the devices shown in FIGS. 3-6. For example, process 1300 may be executed by control circuitry 304 (FIG. 3) as instructed by control circuitry implemented on user equipment 402, 404, and/or 406 (FIG. 4) in order to determine an overshoot offset using crowdsourced data. In addition, one or more steps of process 1300 may be incorporated into or combined with one or more steps of any other process or embodiment.

At 1302, control circuitry 304 determines a skip-forward value. For example, at location 924 (e.g., a specific time between minute 16 and minute 17 as measured from the start of playback of media asset 508), control circuitry 304 receives input from a user specifying a time duration to associate with a skip-forward command. For example, control circuitry 304 receives an input from the user specifying that the skip-forward value should be set to one minute twenty seconds.

At 1304, control circuitry 304 determines the skip-forward location in media asset 508 based on the current location. For example, control circuitry 304 determines, based on the input, that the user wishes to skip forward by one minute twenty seconds, a skip-forward location 908 (e.g., a specific time between minute 18 and minute 19 as measured from the start of playback of media asset 508).

At 1306, control circuitry determines whether crowdsourcing data is available for media asset 508. For example, control circuitry 304 connects to media guidance data source 418 using communications network 414 to query a crowdsourcing database containing crowdsourced data associated with specific media assets. For example, in the case of media asset 508, the crowdsourcing database contains data based on commands issued by each user that viewed media asset 508, as well as timestamps associated with the start and end locations of each command, with respect to the beginning of playback of media asset 508. Such commands include skip-forward commands, skip-back commands, pause commands, play commands, and the like. Based on the query, control circuitry 304 determines whether any crowdsourced data is available for media asset 508. Should control circuitry determine that crowdsourcing data is unavailable for media asset 508, process 1300 continues to 1322. Otherwise, if control circuitry determines the presence of crowdsourced data for media asset 508, process 1300 continues to 1308.

At 1322, control circuitry 304 determines an average overshoot offset value for the user. For example, control circuitry queries a user profile stored in storage 308 to determine the average amount of time that the user rewinds a media asset immediately, or nearly immediately, after skip-forwarding though a media asset. Process 1300 then continues to 1326.

At 1308, control circuitry 304 determines a time interval for searching crowdsourcing overshoot offset data. Control circuitry 304 determines all entries in the crowdsourcing database which contain data detailing skip-forward operations ending within a time interval 918 for searching crowdsourced overshoot offset data in media asset 508. Control circuitry 304 defines the time interval 918 for searching crowdsourced overshoot offset data to identify only those crowdsourced skip-forward operations associated with media asset 508 which terminated in reasonable temporal proximity to the user's skip-forward location 908. Control circuitry 304 defines the time interval for searching crowdsourced overshoot offset data in various ways. For example, control circuitry 304 calculates the time interval for searching crowdsourced overshoot offset data as the average time duration of all rewind operations logged in the crowdsourcing database occurring in media asset 508 (e.g., two minutes and ten seconds) in which the rewind operation is preceded by a skip-forward operation.

At 1310, control circuitry 304 determines whether the number of overshoot offset data points is above a minimum threshold. For example, control circuitry 304 determines that unless at least four overshoot offset data points are available, the crowdsourced data is too limited to determine an expected overshoot value based on the crowdsourced data. The threshold may be static for all media assets (e.g., it may be set to four for all media assets), or control circuitry 304 may dynamically set the threshold based on various criteria, such as the length of the media asset, the popularity of the media asset, and the like. If control circuitry 304 determines that the number of overshoot offset data points is above a minimum threshold, process 1300 continues to 1312. Should control circuitry 304 determine that the number of overshoot offset data points is below a minimum threshold, process 1300 continues to 1324.

At 1312, control circuitry 304 determines a number of overshoot offset clusters within the time interval for searching crowdsourcing overshoot offset data. For example, control circuitry 304 determines a first rewind operation 902, associated with a first skip-forward end location 910 and a rewind end location 920. Control circuitry 304 further identifies a second rewind operation 928, associated with a second skip-forward end location 904 and a rewind end location 916, a third rewind operation 926, associated with a third skip-forward end location 914 and a rewind end location 916, as well as a fourth rewind operation 912, associated with a fourth skip-forward end location 906, and a rewind end location 916. Control circuitry 304 then clusters the rewind end locations. For example, control circuitry 304 forms a first cluster by determining that users who issued skip-forward operations terminating at locations 914, 928, and 902, then proceeded to rewind through media asset 508 to a rewind end location 916. Similarly, control circuitry 304 forms a second cluster by determining that a user who issued a skip-forward operation ending at location 906 proceeded to rewind through media asset 508 to rewind end location 914.

At 1314, control circuitry 304 determines whether at least one cluster significance value is greater than a predetermined threshold. A cluster significance value indicates the number of crowdsourced skip-forward operations which terminated at a given cluster. For example, control circuitry 304 determines that the cluster significance value of the rewind end location 914 (e.g., corresponding to the rewind operation 902, 926, and 928) is equal to three, as three crowdsourced rewind operations terminate at the cluster corresponding to rewind end location 920. Similarly, control circuitry 304 determines that the cluster significance value of rewind end location 914 is equal to one, as only one crowdsourced rewind operation terminates at the cluster corresponding to rewind end location 920. Control circuitry determines whether a significance value of a cluster is greater than a predetermined threshold. For example, the predetermined threshold is set to two, indicating that two users who had skip-forwarded to a location in media asset 508 within the determined time interval for searching crowdsourced overshoot offset data then issued a rewind command to the same location in media asset 508. Control circuitry 304 may set the predetermined threshold based on a static value (e.g., the predetermined threshold is always set to two), or based on a dynamic value. For example, control circuitry 304 sets the predetermined threshold dynamically based on various criteria, such as the length of the media asset, the popularity of the media asset, and the like. Should control circuitry 304 determine that at least one cluster significance value is greater than the predetermined threshold, process 1300 continues to 1314. Otherwise, process 1300 continues to 1324.

At 1324, control circuitry 304 averages crowdsourced overshoot offset in the determined time interval to determine average crowdsourced overshoot offset. For example, control circuitry 304 averages the overshoot offsets associated with rewind operations 902, 928, 926, and 914.

At 1316, control circuitry 304 selects the cluster with the greatest cluster significance value. For example, control circuitry selects the first cluster.

At 1318, control circuitry 304 determines the location of the cluster. For example, control circuitry 304 determines that the first cluster, which is the cluster with the greatest significance value, is situated at location 920.

At 1320, control circuitry 304 determines the overshoot offset from the skip-forward location to the location of the first cluster. For example, control circuitry 304 determines the difference in time between the location 920 of the first cluster, and the user's skip-forward location 908.

At 1326, control circuitry 304 applies the overshoot offset to skip-forward location in media asset 508. For example, control circuitry 304 rewinds to location 920.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

It is contemplated that the steps or descriptions of FIG. 10, FIG. 11, FIG. 12, and FIG. 13 may be used with any other embodiment of this disclosure. In addition, the steps and descriptions described in relation to FIG. 10, FIG. 11, FIG. 12, and FIG. 13 may be done in alternative orders or in parallel to further the purposes of this disclosure. For example, each of these steps may be performed in any order or in parallel or substantially simultaneously to reduce lag or increate the speed of the system or method.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, detection of a social media interaction associated with a user may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset metadata as described herein may be stored in, and retrieved from, storage 308 of FIG. 3, or media guidance data source 418 of FIG. 4. Furthermore, processing circuitry, or a computer program, may update settings associated with a user, such as user profile attributes, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for controlling media asset playback, the method comprising:
receiving, while a media asset is being played back at a normal playback speed, a skip-forward command associated with a time duration;
in response to receiving the skip-forward command:
determining a new location in the media asset based on a predetermined time duration associated with the skip-forward command;
determining an updated location in the media asset preceding the new location;
skipping forward to the updated location; and
without further input, resuming playback at the updated location at a speed greater than the normal playback speed until additional input is received.

2. The method of claim 1 further comprising resuming playback at normal playback speed at the new location or in response to receiving additional input.

3. The method of claim 1, wherein the determining an updated location in the media asset preceding the new location is based on a predetermined overshoot value.

4. The method of claim 3, wherein the overshoot value is based on a rewind duration for a prior viewer.

5. The method of claim 3, wherein the overshoot value is based on an average rewind duration for a plurality of prior viewers.

6. The method of claim 1, wherein the speed greater than the normal playback speed is a multiple of the normal playback speed.

7. The method of claim 1, wherein the time duration associated with the skip-forward command is selected by a viewer via user interface.

8. The method of claim 1, wherein the time duration associated with the skip-forward command is selected based on a viewer preference corresponding to the media asset.

9. The method of claim 1, wherein the time duration associated with the skip-forward command is 30 seconds.

10. The method of claim 1, wherein the time duration associated with the skip-forward command is 3 minutes.

11. A system for controlling media asset playback, the system comprising:
input/output circuitry configured to:
receive, while a media asset is being played back at a normal playback speed, a skip-forward command associated with a time duration; and
processing circuitry configured to, in response to receiving the skip-forward command:
determine a new location in the media asset based on a predetermined time duration associated with the skip-forward command;
determine an updated location in the media asset preceding the new location;
skip forward to the updated location; and
without further input, resume playback at the updated location at a speed greater than the normal playback speed until additional input is received.

12. The system of claim 11, wherein the processing circuitry is further configured to resume playback at normal playback speed at the new location or in response to the input/output circuitry receiving additional input.

13. The system of claim 11, wherein the processing circuitry is further configured to determine an updated location in the media asset preceding the new location based on a predetermined overshoot value.

14. The system of claim 13, wherein the overshoot value is based on a rewind duration for a prior viewer.

15. The system of claim 13, wherein the overshoot value is based on an average rewind duration for a plurality of prior viewers.

16. The system of claim 11, wherein the speed greater than the normal playback speed is a multiple of the normal playback speed.

17. The system of claim 11, wherein the time duration associated with the skip-forward command is selected by a viewer via user interface.

18. The system of claim 11, wherein the time duration associated with the skip-forward command is selected based on a viewer preference corresponding to the media asset.

19. The system of claim 11, wherein the time duration associated with the skip-forward command is 30 seconds.

20. The system of claim 11, wherein the time duration associated with the skip-forward command is 3 minutes.

* * * * *